United States Patent
Coleman et al.

(10) Patent No.: US 9,858,579 B1
(45) Date of Patent: Jan. 2, 2018

(54) PLAN TUNING ENGINE

(75) Inventors: Alan Coleman, Lafayette, CA (US);
Joshua Kneubuhl, Saint Paul, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1801 days.

(21) Appl. No.: 11/365,153

(22) Filed: Feb. 28, 2006

(51) Int. Cl.
| G06Q 10/00 | (2012.01) |
| G06Q 30/02 | (2012.01) |
| G06Q 10/06 | (2012.01) |

(52) U.S. Cl.
CPC ........... *G06Q 30/02* (2013.01); *G06Q 10/063* (2013.01)

(58) Field of Classification Search
CPC .............................. G06Q 30/02; G06Q 10/063
USPC ...... 705/1–30, 35, 400, 14.41, 14.71, 14.73, 705/7.29, 7.11, 7.31; 707/1; 706/925
See application file for complete search history.

(56) References Cited

U.S. PATENT DOCUMENTS

| 3,017,610 A | 1/1962 | Auerbach et al. |
| 4,744,026 A | 5/1988 | Vanderbei |
| 4,862,357 A | 8/1989 | Ahistrom et al. |
| 4,887,207 A | 12/1989 | Natarajan |
| 4,907,170 A | 3/1990 | Bhattacharya |
| 4,916,443 A | 4/1990 | Barrett et al. |
| 5,063,506 A | 11/1991 | Brockwell et al. |
| 5,117,354 A | 5/1992 | Long et al. |
| 5,189,606 A | 2/1993 | Burns et al. |
| 5,212,791 A | 5/1993 | Damian et al. |
| 5,249,120 A | 9/1993 | Foley |
| 5,299,115 A | 3/1994 | Fields et al. |
| 5,331,546 A | 7/1994 | Webber et al. |
| 5,377,095 A | 12/1994 | Maeda et al. |
| 5,459,656 A | 10/1995 | Fields et al. |
| 5,521,813 A | 5/1996 | Fox et al. |
| 5,615,109 A | 3/1997 | Eder |
| 5,694,551 A | 12/1997 | Doyle et al. |
| 5,710,887 A | 1/1998 | Chelliah et al. |

(Continued)

FOREIGN PATENT DOCUMENTS

| WO | 97/46950 | 12/1997 |
| WO | 98/53415 | 11/1998 |

(Continued)

OTHER PUBLICATIONS

"PCT International Search Report and the Written Opinion of the International Searching Authority", Application No. PCT/US 07/20678, mailed Feb. 26, 2008.

(Continued)

*Primary Examiner* — Sun Li
(74) *Attorney, Agent, or Firm* — Rahan Uddin; Edell, Shapiro & Finnan, LLC

(57) ABSTRACT

A computer implemented method for providing optimized planning is provided. Collected data is analyzed. A plan for a first period of time is created based on the collected data. For a plurality of times during the first period, data collected during the first period is analyzed. At least one tuning indicator is generated based on analyzing the data collected during the first period that indicates whether a tuning should be performed. The plan is tuned a plurality of times during the first period, wherein the tuning uses the data collected during the first period.

20 Claims, 17 Drawing Sheets

(56) References Cited

U.S. PATENT DOCUMENTS

| | | | |
|---|---|---|---|
| 5,712,985 A | 1/1998 | Lee et al. | |
| 5,732,401 A | 3/1998 | Conway | |
| 5,765,143 A | 6/1998 | Sheldon et al. | |
| 5,774,868 A | 6/1998 | Cragun et al. | |
| 5,790,643 A | 8/1998 | Gordon et al. | |
| 5,799,286 A | 8/1998 | Morgan et al. | |
| 5,822,736 A | 10/1998 | Hartman et al. | |
| 5,832,456 A | 11/1998 | Fox et al. | |
| 5,832,458 A | 11/1998 | Jones | |
| 5,873,069 A | 2/1999 | Reuhl et al. | |
| 5,878,400 A | 3/1999 | Carter, III | |
| 5,902,351 A | 5/1999 | Streit et al. | |
| 5,918,209 A | 6/1999 | Campbell et al. | |
| 5,933,813 A | 8/1999 | Teicher et al. | |
| 5,987,425 A | 11/1999 | Hartman et al. | |
| 6,009,407 A | 12/1999 | Garg | |
| 6,009,415 A | 12/1999 | Shurling et al. | |
| 6,029,139 A | 2/2000 | Cunningham et al. | |
| 6,032,123 A | 2/2000 | Jameson | |
| 6,032,125 A | 2/2000 | Ando | |
| 6,044,357 A | 3/2000 | Garg | |
| 6,052,686 A | 4/2000 | Fernandez et al. | |
| 6,078,893 A * | 6/2000 | Ouimet et al. | 705/10 |
| 6,094,641 A | 7/2000 | Ouimet et al. | |
| 6,125,355 A | 9/2000 | Bekaert et al. | |
| 6,134,534 A | 10/2000 | Walker et al. | |
| 6,173,345 B1 | 1/2001 | Stevens | |
| 6,202,070 B1 | 3/2001 | Nguyen et al. | |
| 6,205,431 B1 | 3/2001 | Willemain et al. | |
| 6,219,649 B1 | 4/2001 | Jameson | |
| 6,289,330 B1 | 9/2001 | Jannarone | |
| 6,308,162 B1 | 10/2001 | Ouimet et al. | |
| 6,321,207 B1 | 11/2001 | Ye | |
| 6,341,268 B2 | 1/2002 | Walker et al. | |
| 6,341,269 B1 | 1/2002 | Dulaney et al. | |
| 6,377,932 B1 | 4/2002 | DeMarcken | |
| 6,378,066 B1 | 4/2002 | Lewis | |
| 6,397,193 B1 | 5/2002 | Walker et al. | |
| 6,405,175 B1 | 6/2002 | Ng | |
| 6,430,539 B1 | 8/2002 | Lazarus et al. | |
| 6,456,986 B1 | 9/2002 | Boardman et al. | |
| 6,536,935 B2 | 3/2003 | Parunak et al. | |
| 6,546,387 B1 | 4/2003 | Triggs | |
| 6,553,352 B2 | 4/2003 | Delurgio et al. | |
| 6,567,824 B2 | 5/2003 | Fox | |
| 6,591,255 B1 | 7/2003 | Tatum et al. | |
| 6,609,101 B1 | 8/2003 | Landvater et al. | |
| 6,678,695 B1 | 1/2004 | Bonneau et al. | |
| 6,684,193 B1 | 1/2004 | Chavez et al. | |
| 6,697,824 B1 | 2/2004 | Bowman-Amuah | |
| 6,725,208 B1 | 4/2004 | Hartman et al. | |
| 6,731,998 B2 | 5/2004 | Walser et al. | |
| 6,735,572 B2 | 5/2004 | Landesmann | |
| 6,738,756 B1 | 5/2004 | Brown et al. | |
| 6,745,184 B1 | 6/2004 | Choi et al. | |
| 6,826,538 B1 | 11/2004 | Kalyan et al. | |
| 6,851,604 B2 | 2/2005 | Girotto et al. | |
| 6,889,249 B2 | 5/2005 | Miloushev et al. | |
| 6,910,017 B1 | 6/2005 | Woo et al. | |
| 6,934,931 B2 | 8/2005 | Plumer et al. | |
| 6,965,867 B1 | 11/2005 | Jameson | |
| 6,988,076 B2 | 1/2006 | Ouimet | |
| 7,051,115 B2 | 5/2006 | Chen et al. | |
| 7,058,617 B1 | 6/2006 | Hartman et al. | |
| 7,062,447 B1 | 6/2006 | Valentine et al. | |
| 7,062,477 B2 | 6/2006 | Fujiwara et al. | |
| 7,072,848 B2 | 7/2006 | Boyd et al. | |
| 7,092,896 B2 | 8/2006 | Delurgio et al. | |
| 7,092,918 B1 | 8/2006 | Delurgio et al. | |
| 7,092,929 B1 * | 8/2006 | Dvorak et al. | 705/28 |
| 7,130,811 B1 | 10/2006 | Delurgio et al. | |
| 7,133,848 B2 | 11/2006 | Phillips et al. | |
| 7,133,882 B1 | 11/2006 | Pringle et al. | |
| 7,155,402 B1 | 12/2006 | Dvorak | |
| 7,240,019 B2 | 7/2007 | Delurgio et al. | |
| 7,249,031 B2 | 7/2007 | Close et al. | |
| 7,249,032 B1 | 7/2007 | Close et al. | |
| 7,249,033 B1 | 7/2007 | Close et al. | |
| 7,302,410 B1 | 11/2007 | Venkatraman et al. | |
| 7,308,421 B2 | 12/2007 | Raghupathy et al. | |
| 7,308,435 B2 | 12/2007 | Gockel et al. | |
| 7,349,879 B2 | 3/2008 | Alsberg et al. | |
| 7,363,259 B2 | 4/2008 | Baseman et al. | |
| 7,386,519 B1 | 6/2008 | Delurgio et al. | |
| 7,523,047 B1 | 4/2009 | Neal et al. | |
| 2001/0014868 A1 | 8/2001 | Herz et al. | |
| 2002/0023001 A1 | 2/2002 | McFarlin et al. | |
| 2002/0032610 A1 | 3/2002 | Gold et al. | |
| 2002/0042739 A1 | 4/2002 | Srinivasan et al. | |
| 2002/0042755 A1 | 4/2002 | Kumar et al. | |
| 2002/0107819 A1 | 8/2002 | Ouimet | |
| 2002/0116348 A1 | 8/2002 | Phillips et al. | |
| 2002/0123930 A1 | 9/2002 | Boyd et al. | |
| 2002/0165834 A1 | 11/2002 | Delurgio et al. | |
| 2002/0169657 A1 | 11/2002 | Singh et al. | |
| 2002/0184059 A1 | 12/2002 | Offutt, Jr. et al. | |
| 2002/0198794 A1 | 12/2002 | Williams et al. | |
| 2003/0028437 A1 | 2/2003 | Grant et al. | |
| 2003/0110072 A1 | 6/2003 | Delurgio et al. | |
| 2003/0177103 A1 | 9/2003 | Ivanov et al. | |
| 2003/0200185 A1 | 10/2003 | Huerta et al. | |
| 2003/0220830 A1 * | 11/2003 | Myr | 705/10 |
| 2004/0111358 A1 | 6/2004 | Lange et al. | |
| 2004/0210541 A1 | 10/2004 | Epstien et al. | |
| 2004/0243432 A1 | 12/2004 | Kelly et al. | |
| 2005/0096963 A1 | 5/2005 | Myr et al. | |
| 2005/0108070 A1 | 5/2005 | Kelly et al. | |
| 2006/0026161 A1 | 2/2006 | Henseler | |
| 2006/0047608 A1 * | 3/2006 | Davis et al. | 705/400 |
| 2006/0161504 A1 | 7/2006 | Walser et al. | |
| 2006/0224534 A1 | 10/2006 | Hartman et al. | |
| 2006/0271441 A1 | 11/2006 | Mueller et al. | |
| 2008/0077459 A1 | 3/2008 | Desai et al. | |
| 2008/0086429 A1 | 4/2008 | Venkatraman et al. | |
| 2008/0243645 A1 | 10/2008 | Bayer et al. | |

FOREIGN PATENT DOCUMENTS

| | | |
|---|---|---|
| WO | 00/70519 | 11/2000 |
| WO | 00/70556 | 11/2000 |
| WO | 02/01456 | 1/2002 |

OTHER PUBLICATIONS

"Net Perceptions: Cascade" by Net Perceptions, Inc., 2003; pp. 1-80.

Coleman et al., Scalable Tuning Engine, U.S. Appl. No. 11/364,966, filed Feb. 28, 2006, 58 pages.

Bertsimas, D. and Tsitsiklis, J. N., "Introduction to Linear Optimization", Athena Scientific, pp. 451-453, 1997.

LoPresti, F., "New SPSS Missing Values Analysis Option", Statistics and Social Sciences, Oct. 1998.

Lach, J., "Data Mining Digs in", American Demographics, vol. 21, No. 7, Jul. 1999.

Chapman, J. and Wahlers, R., "A Revision and Empirical Test of the Extended Price-Perceived Quality Model", Journal of Marketing Theory & Practice, vol. 7, No. 3, Summer 1999.

Paulin, G. D. and Ferraro, D. L., "Imputing Income in the Consumer Expenditure Survey", Monthly Labor Review, vol. 117, No. 12, Dec. 1994.

Dembeck, J. L. and Stout, D. E., "Using a Spreadsheet to Solve a Multinational Marketing Problem", Management Accounting, vol. 78, No. 7, Jan. 1997.

Diebold, Francis X., "The Past, Present, and Future of Macroeconomic Forecasting" Economic Perspectives (IJEP), vol. 12, No. 2, pp. 175-192, Spring 1998.

"Supplementary European Search Report", Application No. 02719197.2-2221, dated Feb. 8, 2007.

Montgomery: "The Impact of Micro-Marketing on Pricing Strategies", 1994 The University of Chicago vol. 55/12-A of Dissertation of Abstracts International, p. 3922 (Abstract Only).

(56) References Cited

OTHER PUBLICATIONS

Busch: "Cost Modeling as a Technical Management Tool", Research-Technology Management, Nov./Dec. 1994, vol. 37, No. 6, pp. 50-56.
Mulhern et al. "Measuring Market Response to Price Changes: A Classification Approach". J Busn Res 1995:33.197-205.
Kadiyali et al., "Manufacturer-retailer Channel Interactions and Implications for channel Power: An Investigation of Pricing in Local Market", Marketing Science, Spring 2000, V. 19, Issue 2.
Andrew B. Gelman et al., "Bayesian Data Analysis", pp. 439-455, Chapman & Hall/CRC, First Edition 1995, Reprinted 2000.
Hillier, Frederick S., et al., "Introduction to Operations Research", McGraw-Hill, Inc., 1995, Sixth Edition, pp. 1-14.
"KhiMetrics Helps Retailers Increase Margins with Two New Tools for Their Retail Revenue Management Application Suite." PR Newswire, Mar. 1, 2001.
Barth, Brad. "ShopKo Holds the Price Line." Daily News Record, p. 10, Oct. 4, 2000.
"Manugistics Agrees to Acquire Talus Solutions." PR Newswire, Sep. 21, 2000.
"Goodyear Implements Trilogy's MultiChannel Pricing Solution as Its Enterprise-Wide E-Pricer Platform." Business Wire, p. 2286, Jun. 27, 2000.
"IMRglobal Signs New Product Implementation Agreement with Retek to Improve Retail Pricing and Markdown Process." Business Wire, p. 1590, Jun. 7, 2000.
"New Tools for Modeling Elasticity, Optimizing Prices and Collecting Live Pricing from the Web to Debut at Retail Systems 2000 in Chicago." Business Wire, p. 1484, Apr. 18, 2000.
Smith et al., "A Discrete Optimization Model for Seasonal Merchandise Planning " Journal of Retailing, vol. 74, No. 2, p. 193(29), Summer 1998.
Barth, Brad, "Shopko Tests Automated Markdowns", WWD Oct. 4, 2000, pp. 1-3.
Cook, Martie, "Optimizing Space and Sales with Markdown Software", Office.com, May 31, 2000, p. 1.
"Essentus and Spotlight Solutions Partnership Delivers Precise Markdown Decisions", Business Wire, Apr. 17, 2000, 3 pages.
Melcer, Rachel, "Local Tech Firm Creates Retail Markdown Tool", Business Courier online, Mar. 24, 2000, pp. 1-4.
Technology Strategy Incorporated, www.grossprofit.com, Mar. 2, 2000, pp. 1-20.
Flanagan, David, "Javascript: The Definitive Guide, 3rd Edition," published by O'Reilly in Jun. 1998 (ISBN 1-56592-392-8) section 14.8.
Berners-Lee, T., "Hypertext Markup Language 2.0 Working Paper," Nov 1995 (pp. 1-3).
Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).
Abraham, Magid M. and Leonard M. Lodish, "Promoter: An Automated Promotion Evaluation System," Marketing Science, vol. 6, No. 2, 1987 (p. 101-123).
Little, John D. C., "Brandaid: A Marketing-Mix Model, Part 1: Structure," Operations Research, vol. 23, No. 4, Jul.-Aug. 1975 (p. 628-655).
Cerf, Vinton G. and Robert E. Kahn, "A Protocol for Packet Network Interconnection," IEEE Transactions on Communications COM-22, May 1974, (p. 637-648).
Scherage, Dan, "You Do the Math", Chain Store Age, v76, n7, Jul. 2000.
"Gymboree Enhances Price Management", Retail Systems Alert, vol. 13, No. 6, Jun. 2000.
Binkley, James K., and John M. Connor, "Grocery Market Pricing and the New Competitive Environment." Journal of Retailing, v74, n2, Summer 1998.
"Merriam Webster's Collegiate Dictionary", 10th edition, p. 585, Merriam-Webster Incorporated, 1999.
Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.
A.F.M. Smith, "A General Bayesian Linear Model," University of Oxford, Apr. 1972.
Alan L. Montgomery and Peter R. Rossi, "Estimating Price Elasticities with Theory-Based Priors," Journal of Marketing Research vol. XXXVI, Nov. 1999 (pp. 413-423).
Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).
Alan L. Montgomery, "Creating Micro-Marketing Pricing Strategies Using Supermarket Scanner Data," Marketing Science, vol. 16, No. 4, 1997 (pp. 315-337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).
Arnold Zellner, "On Assessing Prior Distributions and Bayesian Regression Analysis With G-Prior Distributions," Elsevier Science Publishers, 1986 (pp. 233-243).
D. V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.
"PCT International Search Report", Application No. PCT/US03/30488, dated Jan. 28, 2001.
"PCT International Search Report", Application No. PCT/US02/14977, dated May 5, 2003.
Dyer, Robert F., et al., "Case Studies in Marketing Decisions Using Expert Choice" Decision Support Software, 1988, pp. 2-7, 73-108.
"PCT International Search Report", Application No. PCT/US02/36710, dated Jul. 21, 2003.
Yoeman, John Cornelius, Jr. "The Optimal Offering Price for Underwritten Securities", vol. 55/01-A of Dissertation Abstracts International, p. 4743; 1993.
"Pacificorp IRP: Renewables Costs Must Drop 65% To Be Competitive with Gas" McGraw-Hill Publications, 2002.
"Report of Novelty Search" by Patentec, dated Feb. 9, 2001.
Rossi, Delurgio, & Kantor; "Making Sense of Scanner Data;" Harvard Business Review, Reprint F00205.
Bucklin & Gupta, "Brand Choice, Purchase Incidence, and Segmentation: An Integrated Modeling Approach," Journal of Marketing Research, May 1992, pp. 201-215, vol. XXIX.
Smith, Mathur, & Kohn; "Bayesian Semiparametric Regression: An Exposition and Application to Print Advertising;" Jan. 3, 1997; Australian Graduate School of Management, University of New South Wales, Sydney 2052, Australia.
Blattberg and Deighton, "Manage Marketing by the Customer Equity;" Harvard Business Review, Jul.-Aug. 1996, pp. 136-144.
Christen, Gupta, porter, Staelin & Wittink; "Using Market-Level Data to Understand the Effectiveness of Promotional Activities;" Dec. 22, 1995.
Link, Ross; "Are Aggregate Scanner Data Models Biased?" Journal of Advertising Research, Sep./Oct. 1995, pp. RC8-RC12, ARF.
Russell & Kamakura, "Understanding Brand Competition Using Micro and Macro Scanner Data," Journal of Marketing Research, vol. XXXI (May 1994), pp. 289-303.
Jones, John Philip, "The Double Jeopardy of Sales Promotions," Harvard Business Review, Sep.-Oct. 1999, pp. 145-152.
Buzzell, Quelch, and Salmon, "The Costly Bargain of Trade Promotion;" Harvard Business Review, reprint 90201, Mar.-Apr. 1990, pp. 1-9.
Curry, Divakar, Mathur, and Whiteman; "BVAR as a Category Management Tool: An Illustration and Comparison with Alternative Techniques;" Journal of Forecasting, vol. 14, Issue No. 3 (1995), pp. 181-199.
"Report of Novelty Search" by Patentec, dated Jul. 25, 2001.

(56) References Cited

OTHER PUBLICATIONS

Stephen J. Hoch et al., "Store Brands and Category Management", The Wharton School, University of Pennsylvania, Mar. 1998, pp. 1-38.
Bruce G.S. Hardie et al., "Attribute-based Market Share Models: Methodological Development and Managerial Applications", The Wharton School, University of Pennsylvania, Working Paper 98-009, pp. 1-48.
Alan Mercer, "Non-linear Price Effects", Journal of the Market Research Society, dated Jul. 1, 1996, p. 227.
Rockney G. Walters, "Assessing the Impact of Retail Price Promotions on Product Substitution, Complementary Purchase, and Interstore Sales Displacements", Journal of Marketing, vol. 55, Apr. 1991, pp. 17-28.
Robert C. Blattberg et al., "How Promotions Work", Marketing Science, vol. 14. No. 3, Part 2 of 2, 1995, pp. G122-G132.
Peter M. Guadagni et al., "A Logit Model of Brand Choice Calibrated on Scanner Data", Marketing Science, vol. 2, No. 3, Summer 1983, pp. 203-238.
Lee G. Cooper et al., "Standardizing Variables in Multiplicative Choice Models", Journal of Consumer Research, vol. 10, Jun. 1983, pp. 96-108.
Eileen Bridges et al., "A High-Tech Product Market Share Model with Customer Expectations", Marketing Science, vol. 14, No. 1, Winter 1995, pp. 61-81.
Richard R. Batsell, et al., "A New Class of Market Share Models", Marketing Science, vol. 4, No. 3, Summer 1985, pp. 177-198.
Jagmohan S. Raju, "The Effect of Price Promotions on Variability in Product Category Sales", Marketing Science, vol. 11, No. 3, Summer 1992, pp. 207-220.
Robert J. Dolan, "How Do You Know When the Price is Right?", Harvard Business Review, Sep.-Oct. 1995 pp. 5-11.
Fusun Gonul, "Modeling Multiple Sources of Heterogeneity in Multinomial Logit Models: Methodological and Managerial Issues", Marketing Science, vol. 12, No. 3, Summer 1993, pp. 213-229.
Robert M. Schindler et al., "Increasing Consumer Sales Response Through Use of 99-Ending Prices", Journal of Retailing, Jun. 1, 1996.
Francis J. Mulhem et al., "The Relationship between Retail Price Promotions and Regular Price Purchases", Journal of Marketing Research, vol. XXXI, Feb. 1994, pp. 28-43.
Sunil Gupta, "Reflections on 'Impact of Sales Promotions on When, What, and How Much to Buy'", Journal of Marketing Research, vol. XXX, Nov. 1993, pp. 522-524.
Richard A. Briesch, "Does It Matter How Price Promotions Are Operationalized?", Marketing Letters 8:2 (1997), pp. 167-181.
Byung-Do Kim et al., "Modeling the Distribution of Price Sensitivity and Implications for Optimal Retail Pricing", Journal of Business and Economic Statistics, Jul. 1995, vol. 13, No. 3.
William R. Dillon et al., "A Segment-level Model of Category Volume and Brand Choice", Marketing Science, vol. 15, No. 1, 1996, pp. 38-59.
Stephen J. Hoch et al., Determinants of Store-Level Price Elasticity, Journal of Marketing Research, vol. XXXII (Feb. 1995), pp. 17-29.
Magid M. Abraham et al., "An Implemented System for Improving Promotion Productivity Using Store Scanner Data", Marketing Science, vol. 12, No. 3, Summer 1993.
Peter S. Fader et al., "Modeling Consumer Choice Among SKUs", Journal of Marketing Research, vol. XXXII (Nov. 1996), pp. 442-452.
"KhiMetrics and Retek Form Marketing Alliance for Comprehensive Retail Pricing Solution." PR Newswire, Feb. 19, 2001.

\* cited by examiner

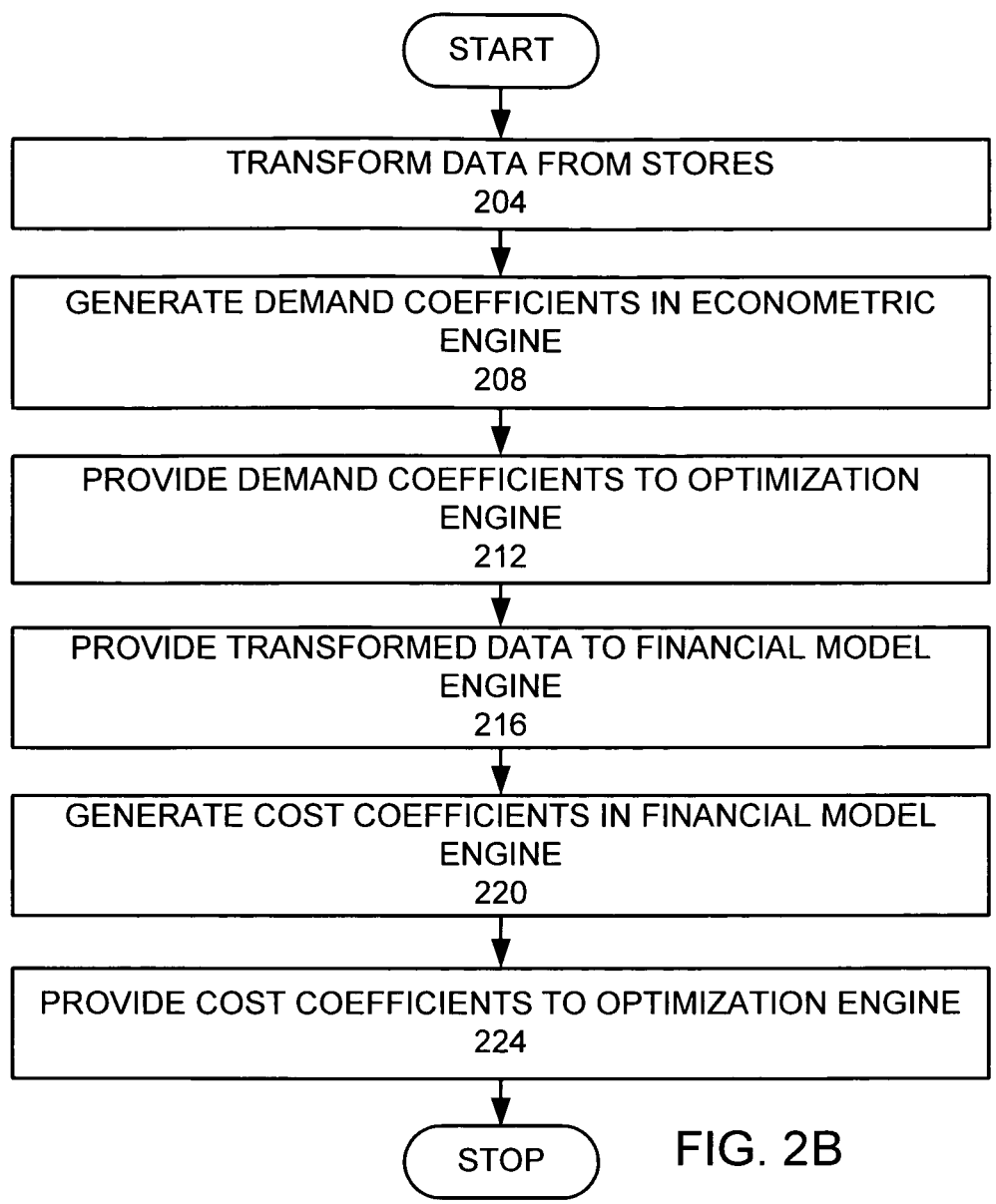

FIG. 15

| Category | LPA Model Date | Weeks Since LPA Model | Last Model Date | Weeks since Last Model | Last Refresh Date |
|---|---|---|---|---|---|
| ANALGESICS | Feb 7, 2003 | 158 | Jan 24, 2006 10:22 AM | 3 | Mar 9, 2005 2:30 PM |
| CANNEDVEGETABLES | Feb 6, 2003 | 158 | Jan 28, 2004 1:32 AM | 107 | |
| COFFEE | Mar 7, 2005 | 50 | Feb 9, 2006 6:16 PM | 1 | Mar 7, 2005 7:38 PM |
| DEODORANT | Jan 30, 2003 | 159 | Mar 12, 2005 10:47 AM | 49 | Feb 12, 2003 1:45 PM |
| DOGFOOD | Mar 11, 2005 | 49 | Mar 11, 2005 2:10 PM | 49 | Jan 25, 2006 10:56 PM |
| CANNEDDRYSOAKBEANS | Oct 29, 2003 | 120 | Oct 29, 2003 9:50 AM | 120 | Jan 26, 2006 1:52 AM |
| DRYRICE | Jan 23, 2006 | 4 | Feb 13, 2006 1:21 PM | 0 | |

FIG. 16

Popup menu (1608):
- View Modeling Jobs
- Create New Modeling Job
- View Host Status

PLAN TUNING ENGINE

BACKGROUND OF THE INVENTION

The present invention relates to providing a computer implemented profit optimization system.

In business and other areas, large quantities of information need to be recorded, processed, and mathematically manipulated to make various determinations. From these determinations, decisions may be made.

For example, in businesses, prices of various products must be set. Such prices may be set with the goal of maximizing margin or demand or for a variety of other objectives. Margin is the difference between total revenue and costs. Total sales revenue is a function of demand and price, where demand is a function of price. Demand may also depend on the day of the week, the time of the year, the price of related products, location of a store, the location of the products within the store, advertising and other promotional activity both current and historical, and various other factors. As a result, the function for forecasting demand may be very complex. Costs may be fixed or variable and may be dependent on sales volume, which in turn depends on demand. As a result, the function for forecasting margin may be very complex. For a chain of stores with tens of thousands of different products, identifying the relevant factors for each product and store, then determining a function representing that demand are difficult. The enormous amount of data that must be processed for such determinations is too cumbersome even when done by computer. Further, the methodologies used to forecast demand and the factors that contribute to it require the utilization of non-obvious, highly sophisticated statistical processes.

Such processes are described in U.S. patent application Ser. No. 09/742,472, entitled IMPUTED VARIABLE GENERATOR, filed Dec. 20, 2000 by Valentine et al., and U.S. patent application Ser. No. 09/741,958, entitled PRICE OPTIMIZATION SYSTEM, filed Dec. 20, 2000 by Venkatraman et al., which both are incorporated by reference for all purposes.

It is desirable to provide an efficient process and methodology for determining the prices of individual products such that margin (or whatever alternative objective) is optimized.

SUMMARY OF THE INVENTION

To achieve the foregoing and other objects and in accordance with the purpose of the present invention a computer implemented method for providing optimized sales planning for a plurality of stores is provided. Sales, cost, and competitive data are collected from the plurality of stores. The collected sales, cost, and competitive data are analyzed. A sales plan is created for a first period of time, which is at least six months, based on the collected data. On an at least weekly basis during the first period sales, cost, and competitive data collected on an at least weekly basis during the first period. At least one tuning indicator is generated based on the analyzing data collected on an at least weekly basis during the first period that indicates whether a tuning should be performed. On demand tuning of the sales plan is provided during the first period, wherein the tuning uses the sales, cost, and competitive data collected during the first period.

In another manifestation of the invention, a computer implemented method for providing optimized planning is provided. Collected data is analyzed. A plan for a first period of time is created based on the collected data. For a plurality of times during the first period, data collected during the first period is analyzed. At least one tuning indicator is generated based on analyzing the data collected during the first period that indicates whether a tuning should be performed. The plan is tuned a plurality of times during the first period, wherein the tuning uses the data collected during the first period.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and 2B are flow charts of a process that uses the optimizing system.

FIG. 4 is a schematic illustration of an example of a flow through.

FIG. 15 is a screen shot that shows a simple indicator model for health products for various product categories.

FIG. 16 is a screen shot that shows the screen shot of FIG. 15, but with a right-click menu.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In planning, it is desirable to use data to create optimization plans. For example, in the retail industry, it is desirable to use sales data to optimize margin (profit) by setting optimized prices or by optimizing promotions. For retail chains that carry a large variety of items, the optimizations may be performed less than three times a year due to the slowness in processing data due to the large quantities of data and the complex processing involved. As a result, changes in the market or a flaw in an optimization may not be noticed for several months or may never be noticed.

The invention is able to process large amounts of data performing complex operations in a short time period, and provides frequently updated data analysis. Thus if a six-month sales plan is created and implemented, within the first few weeks of the sales plan, an updated analysis may be made to determine if the sales plan is incorrect or if conditions of the market have changed, and then generate an updated (tuned) plan, if needed. The invention may provide a flag or some other indicator to suggest whether tuning is desirable and then provide updated information to a user and then allow a user to revise and implement an updated plan.

A data transformation and synthesis platform is provided, which allows a scalable and parallel system for processing large amounts of data.

I. Optimization System

To facilitate understanding, an embodiment of the invention will be provided as part of a price optimization system. The purpose of the price optimization system is to receive raw data that relates to a specified econometric problem and to produce coefficients for econometric modeling variables that represent the significant factors affecting the behaviors represented by the data. In one example, the price optimization system produces coefficients that represent the driving factors for consumer demand, synthesized from sales volume and other retail-business related data inputs.

Figure 1:
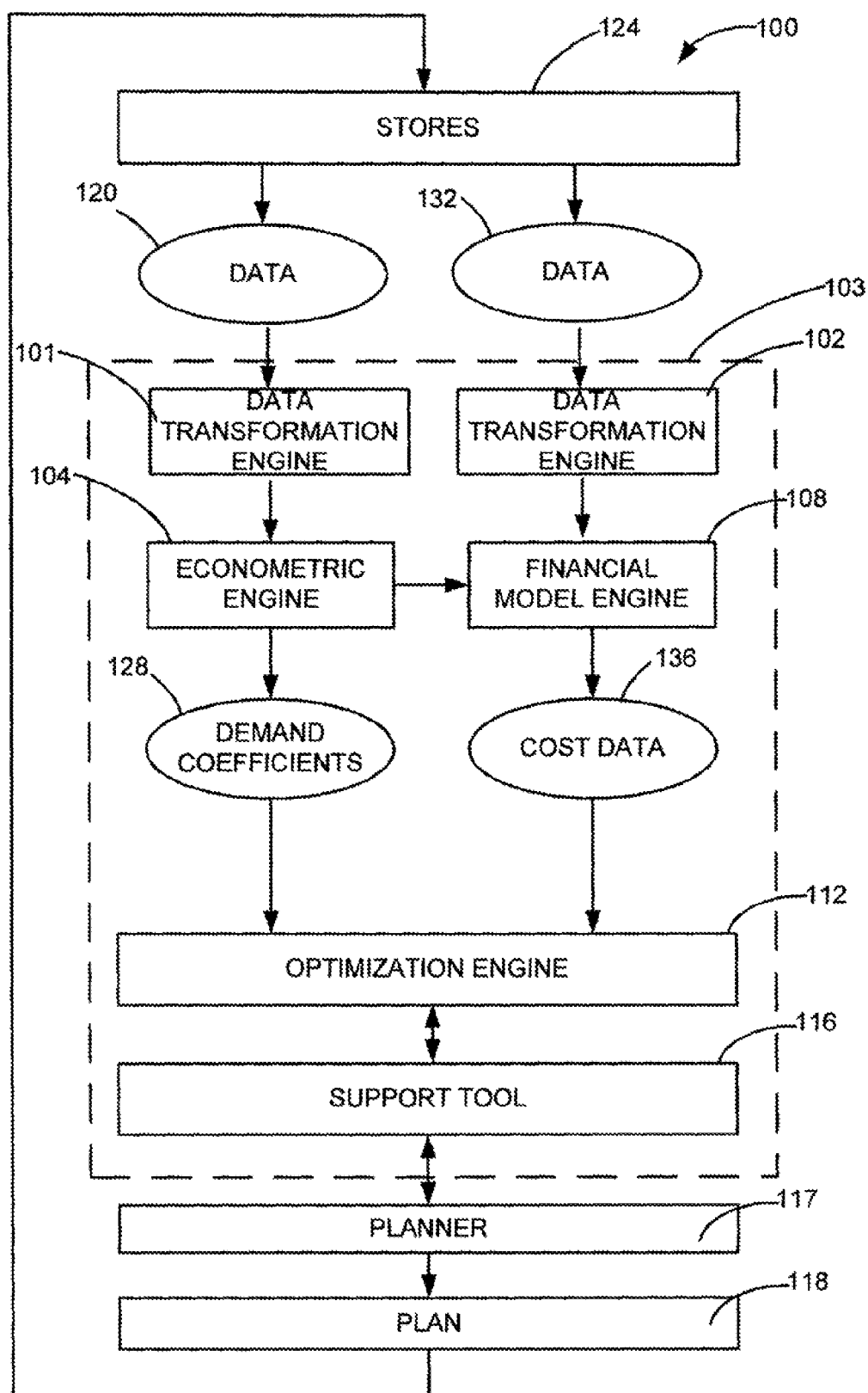
FIG. 1 is a high level schematic view of an optimizing system.

FIG. 1 is a schematic view of an optimizing system 100 using a processing system 103. The processing system 103 comprises a first data transformation engine 101, a second data transformation engine 102, econometric engine 104, a financial model engine 108, an optimization engine 112, and a support tool 116. The econometric engine 104 is connected to the optimization engine 112, so that the output of the econometric engine 104 is an input of the optimization engine 112. The financial model engine 108 is connected to the optimization engine 112, so that the output of the financial model engine 108 is an input of the optimization engine 112. The optimization engine 112 is in two-way communications with the support tool 116 so that output of the optimization engine 112 is provided as input to the support tool 116. The support tool 116 is in two-way communication with a planner 117, who is a user. The planner 117 may use the support tool to generate a plan 118. The plan 118 is implemented by the stores 124.

Figure 2A:
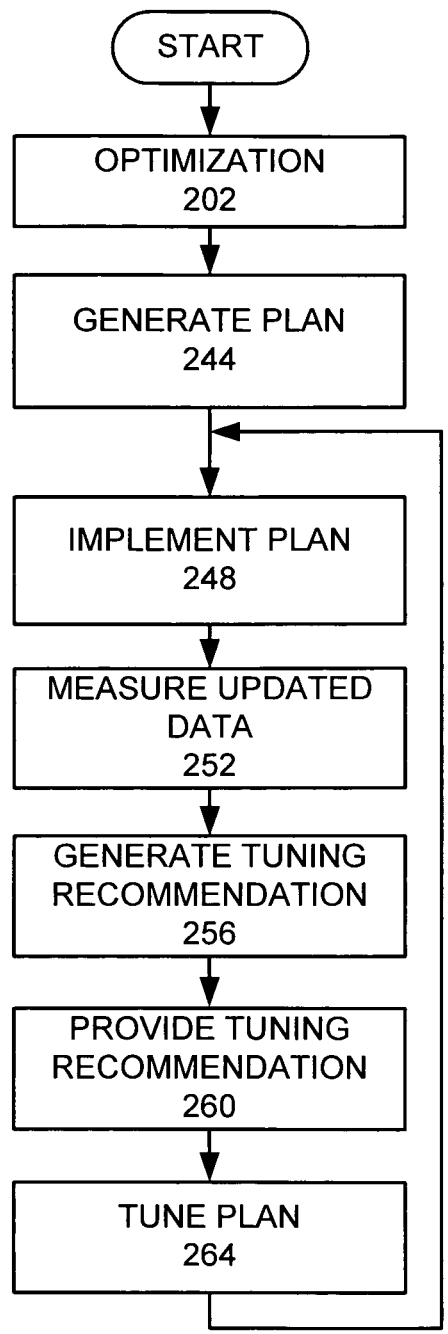

FIG. 2A is a high level flow chart of an optimizing process that uses the optimizing system 100. An optimization is performed (step 202)

FIG. 2B is a more detailed flow chart of the optimization (step 202). Data 120, 132 is provided from the stores 124 to the first data transformation engine 101 and the second data transformation engine 102, where the data from the stores is transformed (step 204). Generally, the data provided to the first data transformation engine 101 and the second data transformation engine 102 may be point-of-sale information, product information, and store information. The transformed data from the first data transformation engine 101 is then provided to the econometric engine 104. The econometric engine 104 processes the transformed data to provide demand coefficients 128 (step 208) for a set of algebraic equations that may be used to estimate demand (volume sold) given certain marketing conditions (i.e. a particular store in the chain), including a price point. The demand coefficients 128 are provided to the optimization engine 112 (step 212). Additional processed data from the econometric engine 104 may also be provided to the optimization engine 112. The financial model engine 108 may receive transformed data from the second data transformation engine 102 (step 216) and processed data from the econometric engine 104. The transformed data is generally cost related data, such as average store labor rates, average distribution center labor rates, cost of capital, the average time it takes a cashier to scan an item (or unit) of product, how long it takes to stock a received unit of product and fixed cost data. The financial model engine 108 may process the data to provide a variable cost and fixed cost for each unit of product in a store (step 220). The processing by the econometric engine 104 and the processing by the financial model engine 108 may be done in parallel. Cost data 136 is provided from the financial model engine 108 to the optimization engine 112 (step 224). The optimization engine 112 utilizes the demand coefficients 128 to create a demand equation. The optimization engine is able to forecast demand and cost for a set of prices to calculate net profit (margin).

A plan is then generated (step 244). In order to generate a plan, the planner 117 provides to the support tool 116 optimization rules. The optimization engine 112 may use the demand equation, the variable and fixed costs, and the rules to compute an optimal set of prices that meet the rules. The planner 117 may be able to provide different sets of rules to create different scenarios to determine different "What if" outcomes. From the various scenarios and outcomes, the planner is able to create a plan.

For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition. In the specification and claims, the phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model, which lies within constraints specified by the rules. When profit is maximized, it may be maximized for a sum of all measured products. Such a maximization, may not maximize profit for each individual product, but may instead have an ultimate objective of maximizing total profit.

For a price optimization plan, the optimal set of prices is the plan. The plan may be for a long term. For example, the plan may set weekly prices for the next six months.

The plan is then implemented (step 248). This may be done by having the planner 117 send the plan 118 to the stores 124 so that the stores carry out the plan. In one embodiment, the support tool provides a graphic user interface that provides a button that allows the planner to implement the plan. The support tool would also have software to signal to the stores to implement the plan. In another embodiment, software on a computer used by the planner would integrate the user interface of the support tool with software that allows the implementation of the plan displayed by the support tool by signaling to the stores to implement the plan.

The results of the plan are measured with updated data (step 252). Updated data may be provided on a weekly or daily basis. The updated data may be sent to the processing system 103.

The updated data is used to generate a tuning recommendation (step 256). This may be done in various ways. One way is by generating a new plan, which may be compared with the long range plan. Another way may be to use the updated data to see how accurate the long range plan was for optimization or for prediction of sales. Other data may be measured to determine if tuning should be recommended without modeling the updated data.

In one embodiment the detection of changes to externally defined cost and competitive price information, and updates to the plan required to maintain business rule conformance are used as factors to determine whether tuning is needed. To detect such factors the econometric model is not needed, but instead other factors are used. The econometric model may then be updated based on such changes to "tune" the optimized plan for changing conditions In another embodiment, tuning is performed when certain threshold conditions are reached—i.e. changes are substantial enough to materially impact the quality of the previously optimized plan. In such processes, the econometric model may be used to provide predictions and then compared to actual data.

The system is able to provide a tuning recommendation (step 260). This may be implemented by setting a range or limits either on the data itself or on the values it produces. In the first case, if changes to the updated data relative to the original data exceed a limit or move beyond a certain range, a flag or other indicator may be used to recommend tuning to the user. In the second case, if the updated data creates prediction errors beyond the specified range or limits, a flag may be used to recommend tuning to a user.

For example, a competitor price index may be used in the optimization and in generation of a tuning indicator. A competitor price index is a normalized index of competitor prices on a set of items sold at a set of locations in relation to those provided by the plan, using competitor price data that is provided through various services. As a specific example, a user might define a competitor price index on all brands and sizes of paper towels sold at stores with a WalMart located less than five miles away (the identification of WalMart locations would be done outside the system). An indicator can then be provided to identify when prices provided by the plan exceed a competitor price index of 105—in other words when they are above the competitor's prices by more than 5% on some subset of items (in the case above, when WalMart has lowered paper towel prices, resulting in a change to that competitor price index relative to the plan). In another example, costs are always changing. It is usually undesirable to change prices immediately every time costs change. Therefore, in another example, the system provides a tuning recommendation when either small cost changes cause an aggregate change of more than 5% or a single cost change causes a cost change of more than 3%. Therefore, the tuning indicators are based on formulas that measure either changes in individual data or changes in relationships between values of the data.

In viewing the re-predicted outcome and the tuning recommendation, the planner 117 is able to have the processing system 103 tune the plan (step 264). The planner 117 may then send out a message to implement the tuned plan (step 248). A single screen may show both the information that the planner needs to use to make a decision and provide a button to allow the planner to implement a decision. The button may also allow tuning on demand, whenever desired by the user.

This process allows for a long term plan to be corrected over the short term. This allows for corrections if the long term plan has an error, which in the short term may be less significant, but over the long term may be more significant. In addition, current events may change the accuracy of a long term model. Such current events may be a change in the economy or a natural disaster. Such events may make a six-month plan using data from the previous year less accurate. The ability to tune the plan on at least a weekly basis with data from the previous week makes the plan more responsive to current events.

In addition, the optimization system provides a promotional plan that plans and schedules product promotions. Without the optimization system, poor-performing promotions may go unidentified until it is too late to make changes that materially affect their performance. The use of constant updates helps to recognize if such a plan creates business problems and also allows a short term tuning to avoid further damage. For example, a promotion plan may predict that a discount coupon for a particular product for a particular week will increase sales of the product by 50%. A weekly update will within a week determine the accuracy of the prediction and will allow a tuning of the plan if the prediction is significantly off.

The system may provide that if a long term plan is accurate within a certain percentage, the long term plan is not changed. In such an embodiment, the system may allow an automatic tuning when a long term plan is not accurate within a certain percentage. In another embodiment, the planner may be allowed to decide whether the long term plan is in enough agreement with the updated data so that the long term plan is kept without tuning.

FIG. 15 is a screen shot 1504 that shows a simple indicator of "model health" for various product categories 1508 based on time since the last full model 1512. Other ancillary information on updates is also provided.

FIG. 16 is a screen shot 1604 that shows the screen shot of FIG. 15, but with a right-click menu 1608 that enables a user to start a new modeling job directly from the screen of "model health" indicators.

Figures 17, 18:
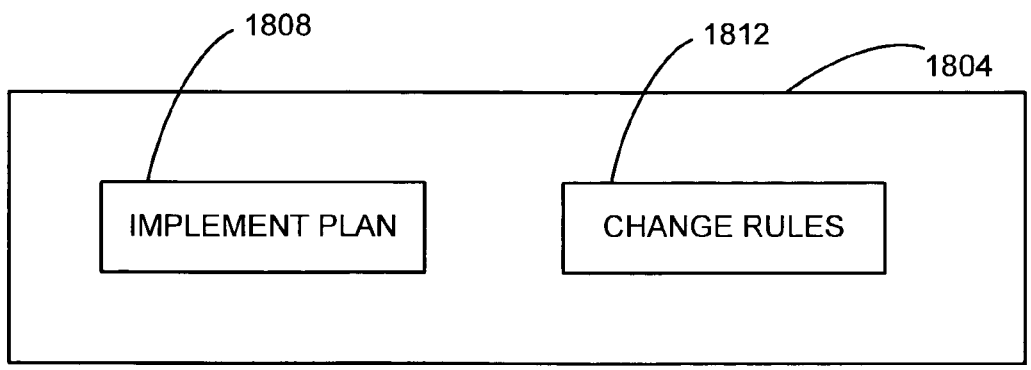
FIG. 17 is a screen shot that shows the values of several competitor price indices.
FIG. 18 is a schematic illustration of part of a screen that shows an option of implementing a tuned plan.

FIG. 17 is a screen shot 1704 that shows the values of several competitor price indices, the product set to which the indices apply 1708, the target base threshold value set for the index 1712, and the current value of the index 1716, derived from plan prices and actual competitor price data.

FIG. 18 is a schematic illustration of part of a screen 1804 that shows an option of implementing a tuned plan 1808 or further tuning a plan by changing the rules 1812.

Thus, the invention allows the integration between the operational system of a business, which sets prices and promotions and performs other sales or business functions, with the analytical system of a business which looks at sales or other performance information, to allow a planner to receive timely analytical information and then change the operational system and then to quickly, through the analytical system, see the results of the change in the operational system to determine if other changes in the operational system need to be made.

Such a constant tuning of a plan is made difficult by the large amount of data that needs to be processed and the complexity of the processing, which could take weeks to process or would be too expensive to process to make such tuning profitable. Therefore, the invention provides the ability to process large amounts of data with the required complexity quickly and inexpensively enough to provide weekly or daily tuning. A balance is made between the benefit of more frequent tuning and the cost and time involved for tuning, so that the tuning is done at a frequency where the benefit from tuning is greater than the cost of tuning at the desired frequency.

In addition, the sales data that is to be updated arrives as a set of records organized by time, product, and location—a data flow. The numeric operations that synthesize demand coefficients are performed as matrix operations, and require their inputs to be in a very specific format—one much different from the format in which the raw customer data arrives. One choke point that slows such operations is transforming customer data so that numerical matrix operations may be performed on the data.

For this purpose, the above inventive system uses data flow processing to transform input data into matrices that are partially in memory and partially on disk at any given time. Matrices are saved wholly on disk and references to the matrices are passed to numerical functions, which process the matrices. The numeric functions process the matrices to provide output data sets, which are kept partially on disk and partially in memory. Upstream data flow processing must complete a matrix before the matrix may be processed by a numerical function.

In addition to matrix processing, there are numerous other numerical functions that operate on different types of structures, including vectors, and tabular data. The data flow processing mechanism allows raw input data to be transformed into the appropriate structure for input to any numerical function, and allows the outputs of those functions to be further transformed as inputs to downstream functions.

Data flow transformations and numeric functions may not always read data row by row. Reading large amount of data from a disk in a nonsequential manner is time intensive and may create another choke point. The invention provides the using of parallel readers, the creating of smaller data subsets, and the processing of data while part of the data is in memory and part of the data is on disk to avoid the time intensive data reading process.

For a six-month plan, a weekly analysis could allow the tuning of the plan up to 26 times. Preferably, the plan is tuned at least 15 times. More preferably, the plan is tuned at least 6 times. In other embodiments, the tuning may be done on a daily basis.

Data 120 is provided to the processing system 103. The data 120 may be raw data generated from cash register data, which may be generated by scanners used at the cash registers. The first data transformation engine 101 and the second data transformation engine 102 format the data so that it is usable in the econometric engine and financial model engine. Some data cleansing, such as removing duplicate entries, may be performed by the first and second data transformation engine 101, 102.

Figure 3:
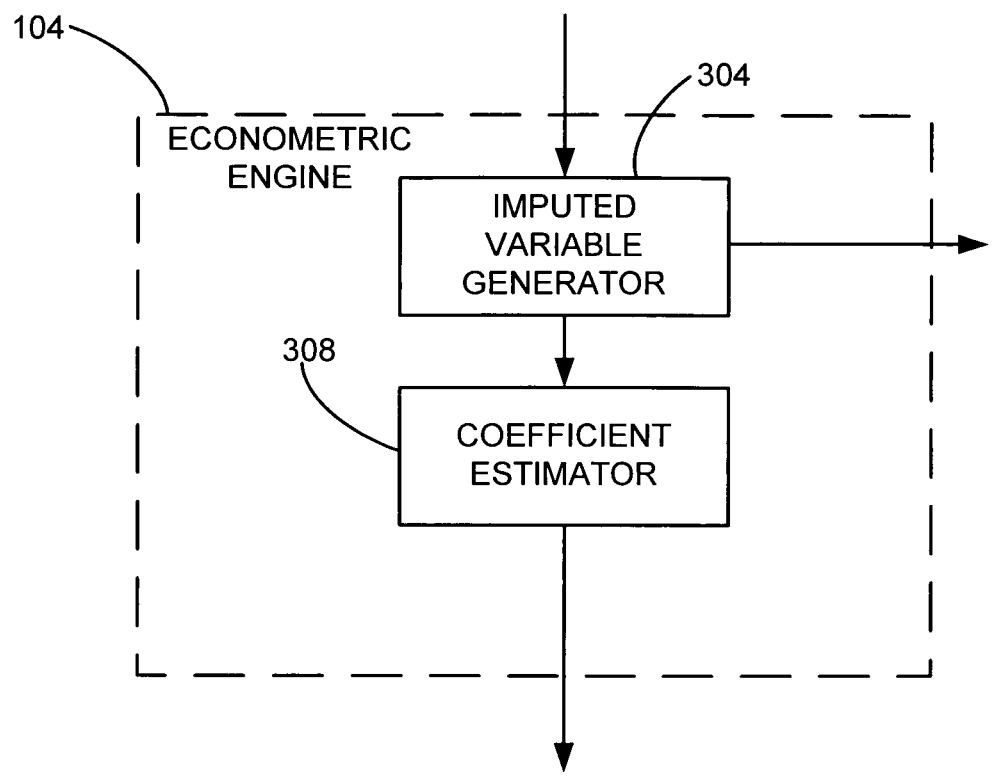
FIG. 3 is a schematic view of an econometric engine.

FIG. 3 is a more detailed view of the econometric engine 104. The econometric engine comprises an imputed variable generator 304 and a coefficient estimator 308. The formatted data from the first data transformation engine 101 is provided to the imputed variable generator 304. The imputed variable generator 304 generates a plurality of imputed econometric variables.

Figure 13:
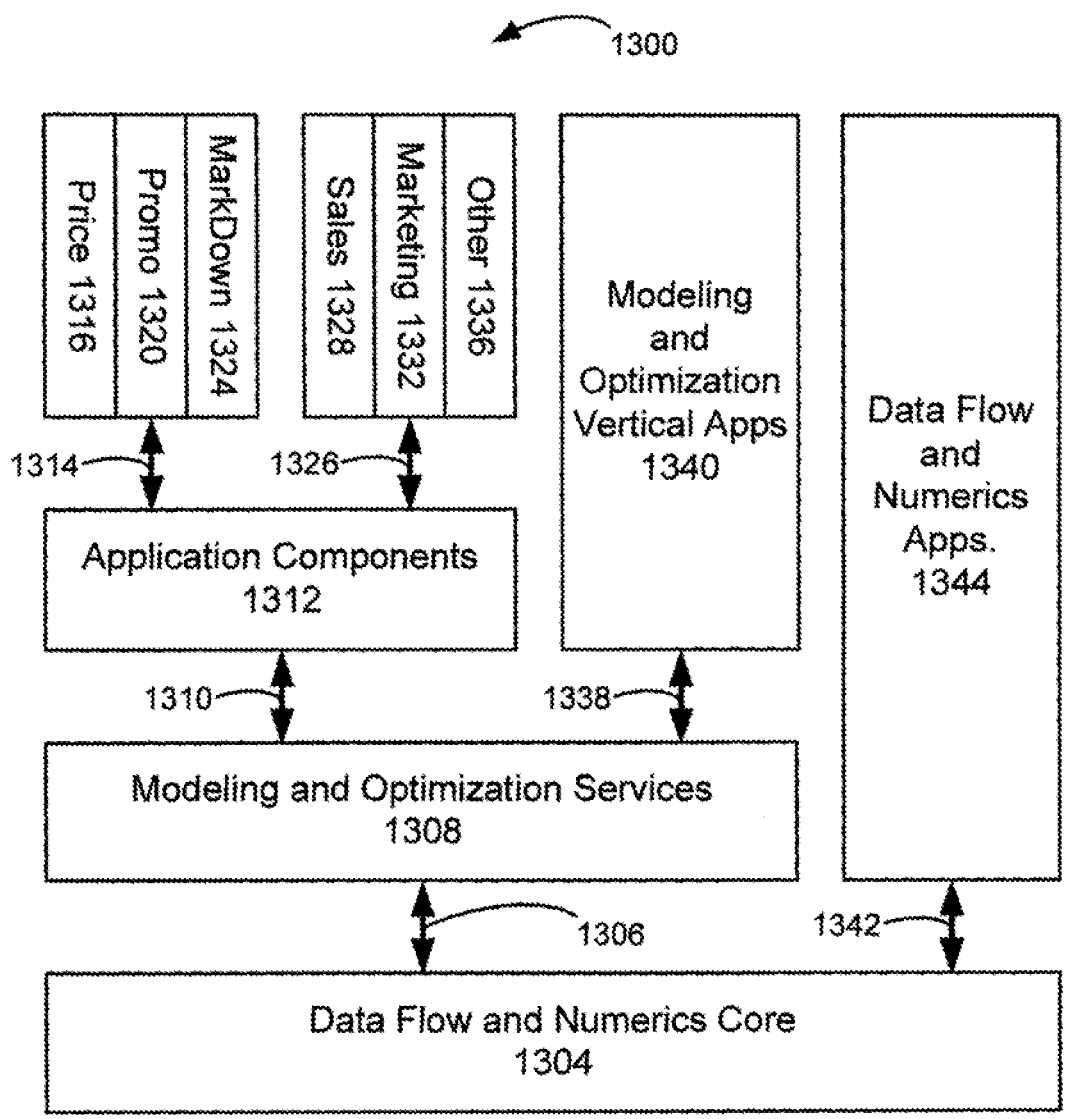
FIG. 13 is a schematic view of a computer architecture.

FIG. 13 is a schematic view of a computer architecture 1300 that is able to provide the processing of the large dataflow. The architecture 1300 provides a data flow and numerics core module 1304, modeling and optimization services module 1308, and application components module 1312. A first interface 1306 connects the data flow and numerics core module 1304 to the modeling and optimization services module 1308. A second interface 1342 connects the data flow and numerics core module 1304 to the data flow and numerics applications 1344. A third interface 1310 connects the modeling and optimization services module 1308 to the applications components module 1312. A fourth interface 1338 connects the modeling and optimization services module to the modeling and optimizations vertical applications module 1340. A fifth interface 1314 connects the applications components module 1312 to three retail application modules for price 1316, promotions 1320, and mark down 1324. A sixth interface 1326 connects the application components module 1312 to three consumer package goods modules (CPG) for sales 1328, marketing 1332, and other various applications 1336. The retail applications and the CPG applications are supported by the applications components module 1312.

The data flow and numerics core 1304 processes large amounts of data and performs numerical operations on the data. An embodiment of the dataflow and numerics core 1304 that provides economic processing is an Econometric Data Transformation and Synthesis Engine (EDTSE). The dataflow and numeric core 1304 forms a combination of ETL (Extract/Transform/Load), which is a data processing term and numerical analytics). The data flow and numerics core 1304 is able to perform complex mathematical operations on large amounts of data. The modeling and optimization services 1308 may be a configurable optimization engine. The applications component 1312 supports applications.

The modeling and optimization vertical applications module 1340 provides applications that are vertical applications supported directly by the modeling and optimization services module 1308. Such applications may be applications for modeling oil and gas well optimization, and financial services portfolio optimization, and other applications that can be described by a mathematical model, which can be modeled and optimized using the platform. The data flow and numeric applications module 1344 provides vertical applications that are supported directly by the data flow and numerics core module 1304.

Figure 4:
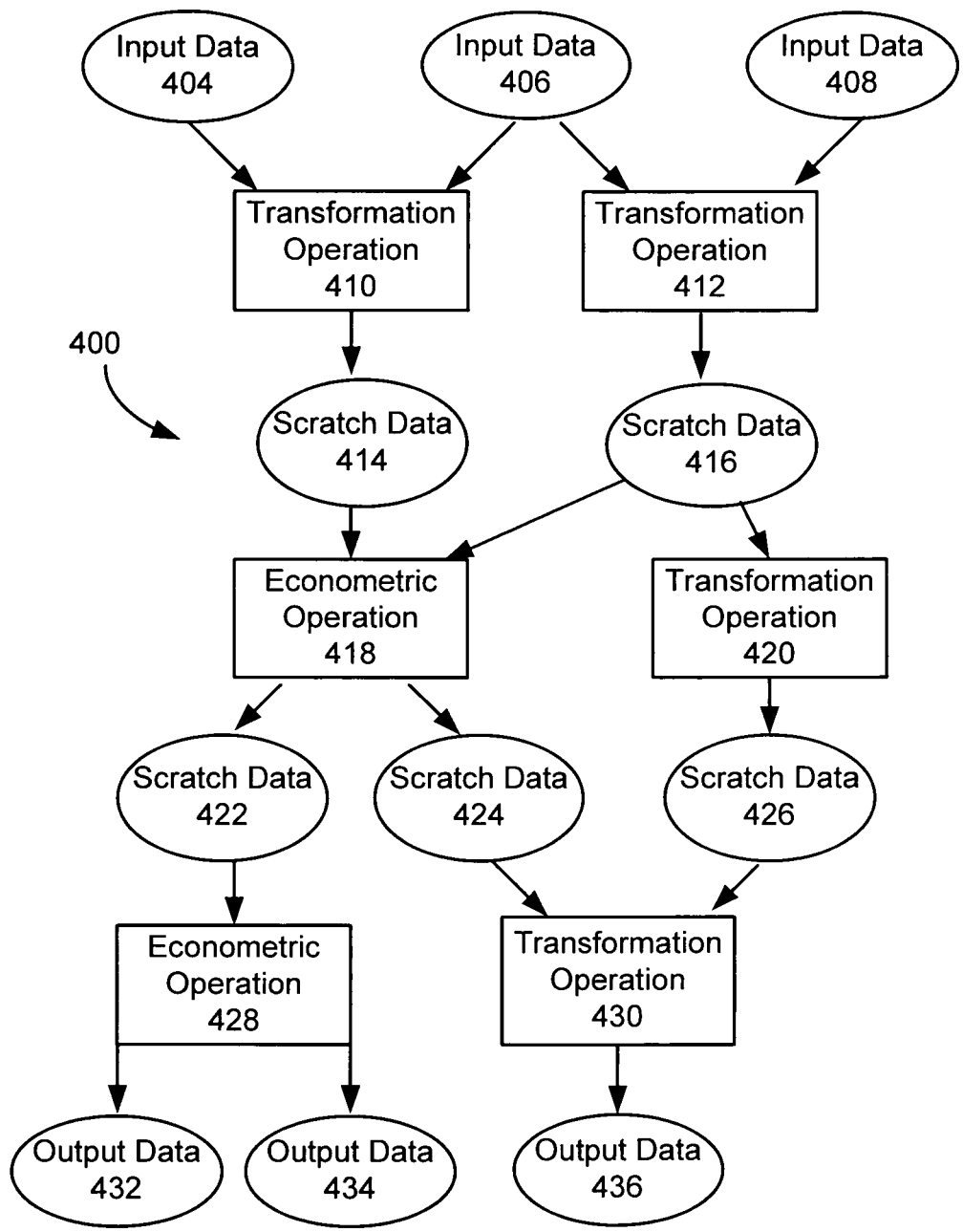

FIG. 4 is a schematic illustration of an example of a flow through 400 of an Econometric Data Transformation and Synthesis Engine (EDTSE). The engine consists of a set of transformation and econometric functions that can be combined/composed into higher-level econometric transformation and synthesis functions using a scripting mechanism. Other flows may be run serially or in parallel on other computers of a network.

The EDTSE allows the creation of complex econometric data outputs by breaking down the problem into a graph of operations on intermediate data sets. The EDTSE then executes this graph, allowing independent nodes to run simultaneously and sequencing dependent node execution. EDTSE graphs partition the data as well, allowing multiple subsets of data to be processed in parallel by those operations that have no intra-dataset dependencies.

This example illustrates the types of top-level operations performed by the EDTSE. All operations may accept multiple inputs and may produce multiple outputs. Operations fall into two primary types: Transformation Operations and Econometric Operations.

Transformation Operations change the structure of the input data set, but do not synthesize new information. These transformations may be simple from a structural perspective (such as filtering to removing selected elements) or may be complex from a structural perspective (such as partial transposition and extraction of non-transposed values in a different format).

Econometric Operations synthesize new values from one or more input data sets, and produce new output data sets from them. As with Transformation Operations, there is a range of complexity. Examples of Econometric Operations include missing value imputation, outlier detection and culling, etc.

Data provided to the EDTSE 400 may be provided by a first input data 404, a second input data 406, and a third input data 408, which may provide different types of data. For example, the first input data 404 may be point-of-sale input data, the second input data 406 may be cost data, and the third input data 408 may be product data. A first transformation operation 410 receives the first input data 404 and the second input data 406. A second transformation operation 412 receives the second input data 406 and the third input data 408. The first and second transformation operations 410, 412 perform transformation operations generally related to changing the structure, content, and format of the data. Such transformation operations do not perform complex mathematical operations to synthesize new information. Output from the first transformation operation 410 is stored as a first scratch data 414 as a first temporary file. Output from the second transformation operation 412 is stored as a second scratch data 416 as a second temporary file.

A first econometric operation 418 receives data from the first scratch data 414 and the second scratch data 416 and performs at least one mathematical operation on the data to synthesize new data, which is outputted as third scratch data 422 in a third temporary file and fourth scratch data 424 in a fourth temporary file. The mathematical operation may be at least one of a matrix operation, such as matrix inversion, transposition, multiplication, addition, subtraction, and arithmetic operations. In addition, it may perform extremely complex numerical algorithms that use matrices as their inputs and outputs; for example, regression analysis with a mix of linear and non-linear variables. In this example, the first econometric operation 418 is performed in parallel with a third transformation operation 420 which receives as input the third scratch data 416, performs transformational operations on the third scratch data, and then outputs fifth scratch data 426 in a fifth temporary file.

In this example, a second econometric operation 428 receives as input the third scratch data 422, performs mathematical operations on the third scratch data to synthesize new data, which is outputted as first output data 432 and second output data 434. One example of new data would be the generation of demand coefficients 128. The fourth transitional operation 430 receives as input the fourth scratch data 424 and the fifth scratch data 426, performs transformational operations, and outputs a third output data 436. Preferably, the first, second, and third output data 432, 434, 436 are stored on a, shared storage.

Figure 5:
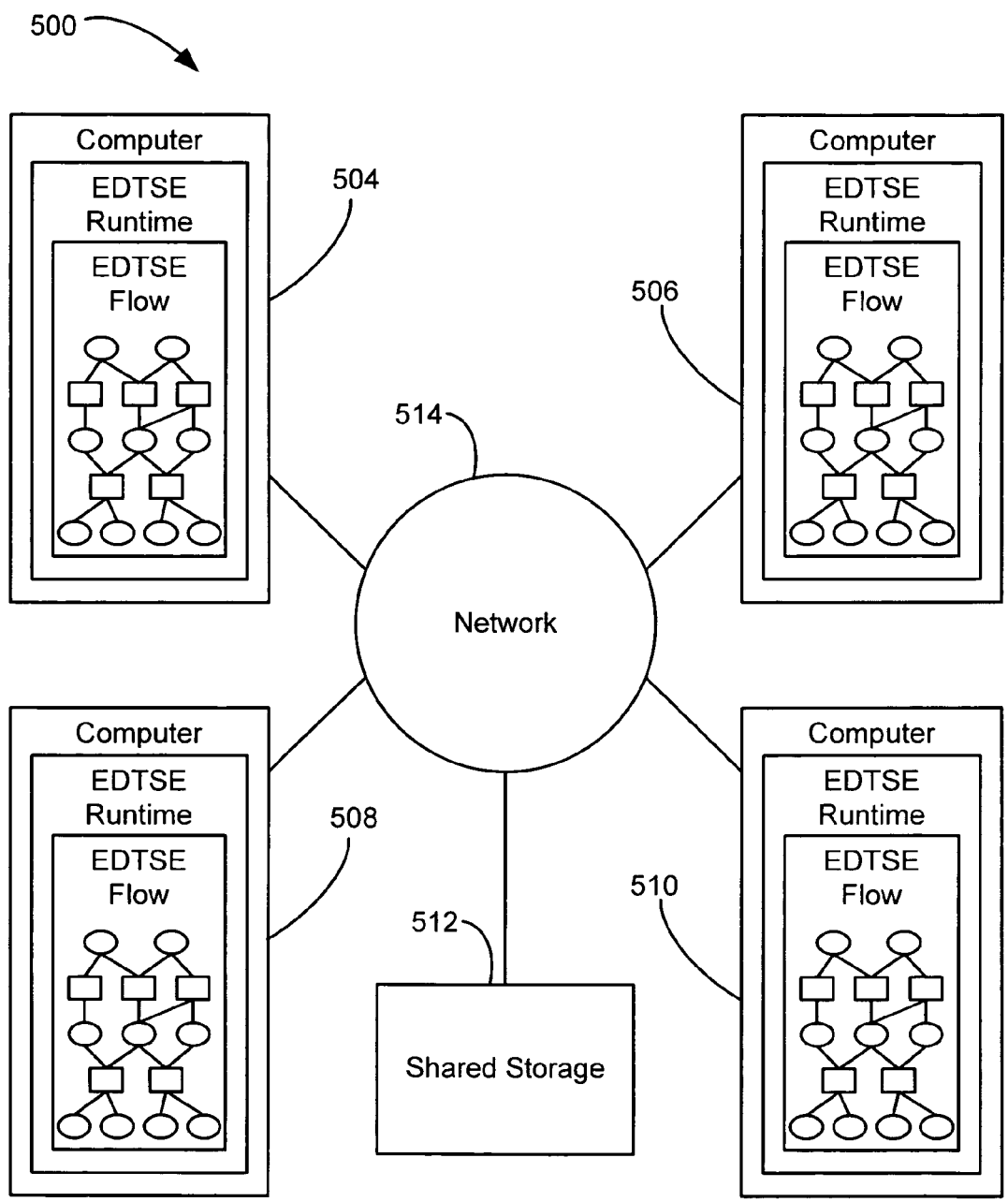
FIG. 5 is a schematic view of a network that may be used in an embodiment of the invention.

FIG. 5 is a schematic view of a computer network 500, provided by an embodiment of the invention. In this embodiment, the computer network comprises a first, second, third, and fourth computer 504, 506, 508, 510, a shared storage 512, and a network 514 connected between the computers 504, 506, 508, 510, and the shared storage 512. In this example, on each computer 504, 506, 508, 510 is computer readable media with computer readable code for the EDTSE. In this example, each computer 504, 506, 508, 510 is running the EDTSE code in an EDTSE run time. EDTSE flows are running in the EDTSE run time. The EDTSE runtime requests for data flows on particular data sets are dispatched. Each runtime instance can execute an EDTSE flow on a dataset or a portion thereof, consuming the appropriate inputs and producing its part of the final output dataset, which is streamed in parallel to its final repository.

Each EDTSE runtime uses local scratch storage for its temporary results, if any. Initial input datasets and final output datasets are written to a shared network storage location. This allows other processes and other parts of the overall software system to provide inputs to and to consume outputs from EDTSE flows. The EDTSE flows can be executed on a single computer or across multiple computers.

Figure 6A:
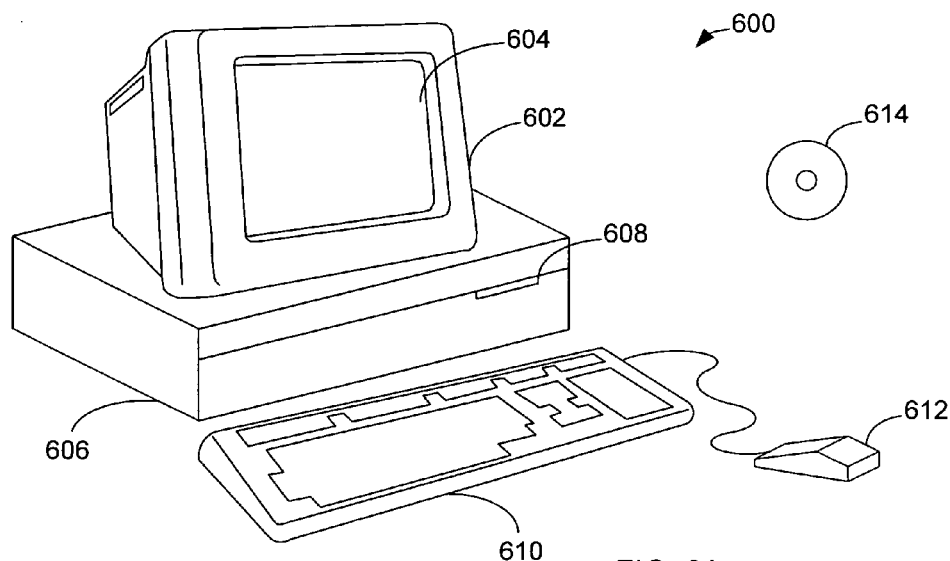
FIGS. 6A and 6B are views of a computer system that may be used in an embodiment of the invention.

FIGS. 6A and B illustrate a computer system 600, which may be any of the computer systems 504, 506, 508, 510 and is suitable for implementing embodiments of the present invention. FIG. 6A shows one possible physical form of the computer system. Of course, the computer system may have many physical forms ranging from an integrated circuit, a printed circuit board, and a small handheld device up to a huge super computer. Computer system 600 includes a monitor 602, a display 604, a housing 606, a disk drive 608, a keyboard 610, and a mouse 612. Disk 614 is a computer-readable medium used to transfer data to and from computer system 600.

Figure 6B:
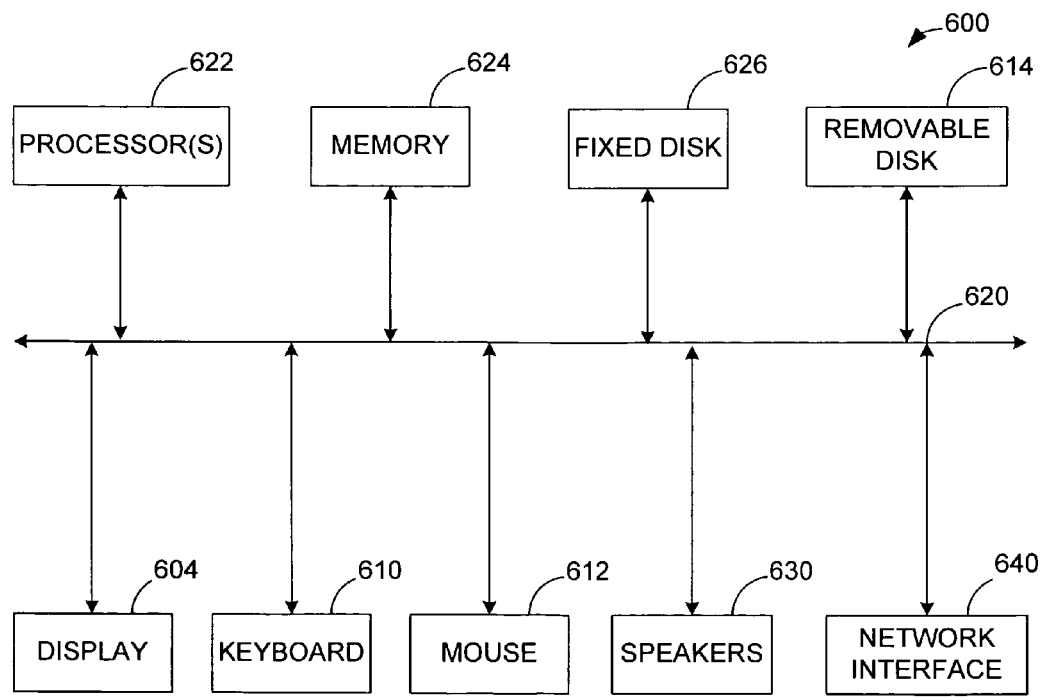

FIG. 6B is an example of a block diagram for computer system 600. Attached to system bus 620 is a wide variety of subsystems. Processor(s) 622 (also referred to as central processing units, or CPUs) are coupled to storage devices, including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data, and the like and is typically a secondary storage medium (such as a hard disk) that is slower than primary storage. It will be appreciated that the information retained within fixed disk 626 may, in appropriate cases, be incorporated in standard fashion as virtual memory in memory 624. Removable disk 614 may take the form of any of the computer-readable media described below.

CPU 622 is also coupled to a variety of input/output devices, such as display 604, keyboard 610, mouse 612, and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Figure 7:
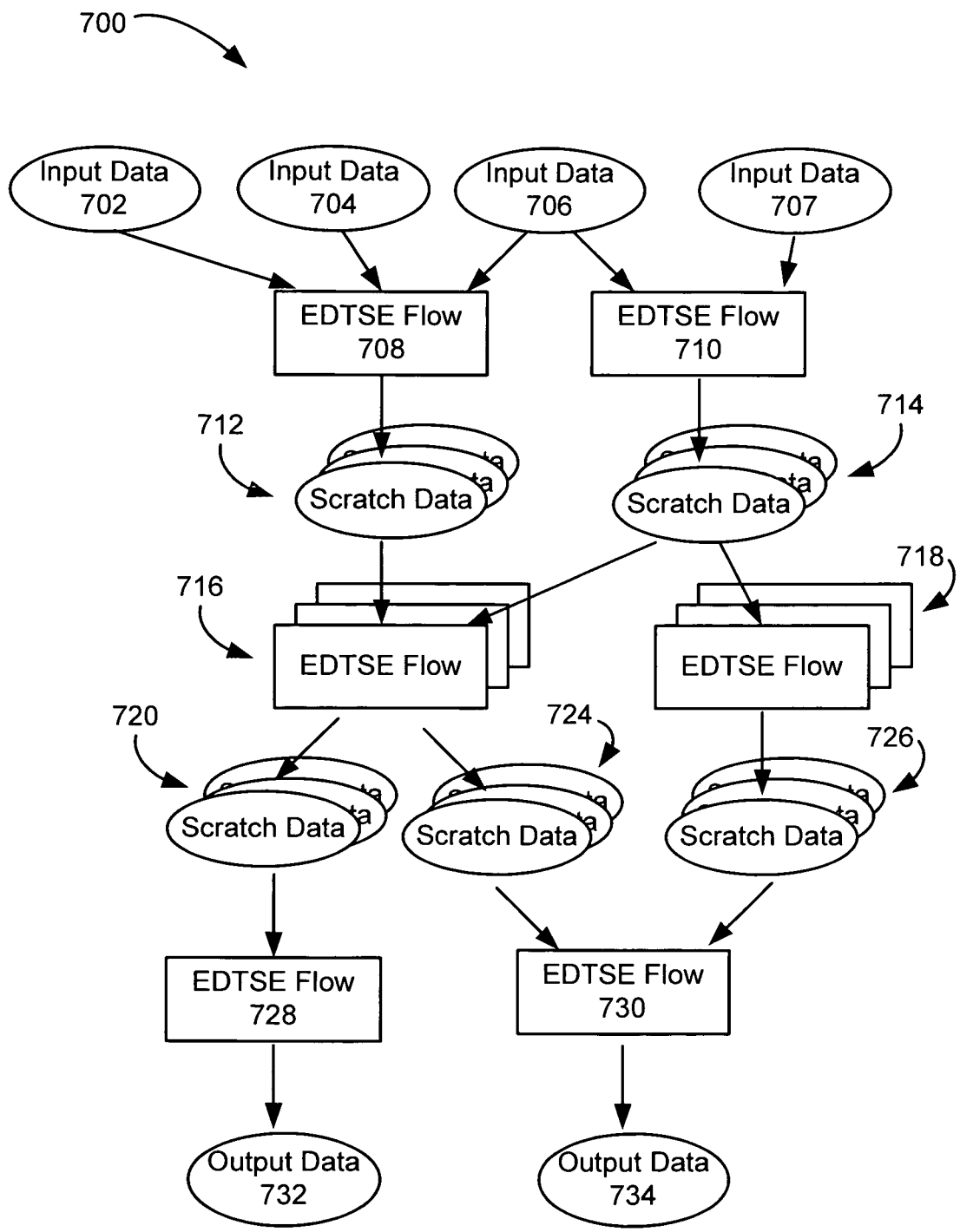
FIG. 7 illustrates composition of an EDTSE flow and flow segments.

FIG. 7 illustrates composition of EDTSE flow and flow segments in general. Individual EDTSE operations are composed into flow segments, which stream a set of operations in parallel. Flow segments can be used directly, or can be composed into larger executable units. In other words, the smallest possible flow segment is two operations—a read and a write. The smallest possible flow is one flow segment.

EDTSE flow segments and flows can be composed into a larger process in the same way that EDTSE operations are composed into a flow segment. The EDTSE runtime executes the composed flow segments and operations based on its analysis of the graph formed by the segments. FIG. 7 also illustrates the way that EDTSE flows can operate in parallel across partitioned data sets.

The EDTSE flow segment 700 in FIG. 7 comprises a first input 702, a second input 704, a third input 706, and a fourth input 707. A first EDTSE flow 708 receives the first input data 702, the second input data 704, and third input data 706, and provides a first scratch data set 712, comprising a plurality of scratch data. In this example, the EDTSE flow 400 in FIG. 4 is the first EDTSE flow 708. A second EDTSE flow 710 receives data from the third input data 706 and the fourth input data 707 and outputs a second scratch data set 714, comprising a plurality of scratch data.

A first set of EDTSE flows 716 may be a plurality of EDTSE flows with each EDTSE flow running on a different computer on the network 500. A second set of EDTSE flows 718 may be a plurality of EDTSE flows with each EDTSE flow running on a different computer on the network 500. Each scratch data of the first scratch data set 712 and each scratch data of the second scratch data set 714 are used to signal a computer running an EDTSE flow of the first set EDTSE flows 716 to cause the EDTSE flow to process scratch data from the first scratch data set 712 and scratch data from the second scratch data set 714. For example, a first scratch data from the first scratch data set 712 and a first scratch data from the second scratch data set 714 may be used to signal a computer running a first EDTSE flow of the first set of EDTSE flows 716 on a first computer, which processes the first scratch data from the first scratch data set 712 and the first scratch data from the second scratch data set 714 and outputs a first scratch data of a third scratch data set 720 and a first scratch data of a fourth scratch data set 724. A second scratch data from the first scratch data set 712 and a second scratch data from the second scratch data set 714 may be used to signal a computer running a second EDTSE flow of the first set of EDTSE flows 716 on a second computer, which processes the second scratch data from the first scratch data set 712 and the second scratch data from the second scratch data set 714 and outputs a second scratch data of a third scratch data set 720 and a second scratch data of a fourth scratch data set 724. A third scratch data from the first scratch data set 712 and a third scratch data from the second scratch data set 714 may be used to signal a computer running a third EDTSE flow of the first set of EDTSE flows 716 on a third computer, which processes the third scratch data from the first scratch data set 712 and the third scratch data from the second scratch data set 714 and outputs a third scratch data of a third scratch data set 720 and a third scratch data of a fourth scratch data set 724.

In a similar manner the second set of EDTSE flows 718 takes input from the second scratch data set 714 and in a parallel manner produces a fifth scratch data set 726.

The third scratch data set 720 is inputted into a third EDTSE flow 728 to produce a first output data 732. The fourth scratch data set 724 and the fifth scratch data set 726 are inputted into a fourth EDTSE flow 730 to produce a second output data 734. The third EDTSE flow 728 and fourth EDTSE flows 730 are examples of how data sets created in parallel may be consolidated into a final form.

This example illustrates how the invention allows for a scalable process using parallel flows. A flow may be arbitrarily made parallel, so that given network resources and the amount of processing needed parallel processes may be added with minimal overhead. Because of the scalability of this platform, the platform may be run on a single laptop computer or on a large network of computers with several racks of servers.

Flows can be made parallel either along the process domain, the data domain, or both. In both of these domains, the parallelization can be either implicit, explicit, or both.

Enablement of parallel processing along the process domain is primarily implicit in the way the flows are constructed—they are composed of subflows, each of which can be considered a distinct executable unit within the flow. If multiple subflows accept the same inputs then all of them can be triggered at the point that input is present. Likewise, if multiple subflows have no input dependencies at all (i.e. they accept completely separate inputs), they can both be executed in parallel without concern.

The creator of a flow may also choose to make explicit choices about how to partition along the process domain. For example, in an implementation that uses a network of computers to solve large problems, the creator of a flow may choose to mark specific subflows as being of appropriate granularity for separate execution on a distinct computer. The system can then distribute the execution of those subflows across the network of computers. Within each individual computer, the subflow remains implicitly parallel along the process domain, meaning that any operations within it that accept the same inputs (or whose inputs simply do not depend on each other) can be executed in parallel.

Flows can also be made parallel along the data domain. This can be done either explicitly or implicitly. To do so explicitly, the creator of the flow must identify a characteristic within the data on which it can be partitioned. The creator can then add a standard data-parallelization operator, such as a parallel reader, at the beginning of the flow which automatically partitions the data, passing segmented outputs simultaneously to downstream operators.

Implicit data partitioning is performed by the system itself. When the execution system constructs an executable form of a flow, it can identify any operators that imply dependencies between records within the data. A standard example of such an operator is a sort, which requires that all the records be examined and potentially reordered. Any subflows in which no such operator appears can, by definition, be executed in an arbitrarily parallel manner because there are no interdependencies between records in the data set. In such cases, the system automatically partitions the input data sets and passes the subsets to multiple downstream subflows.

Figure 8:
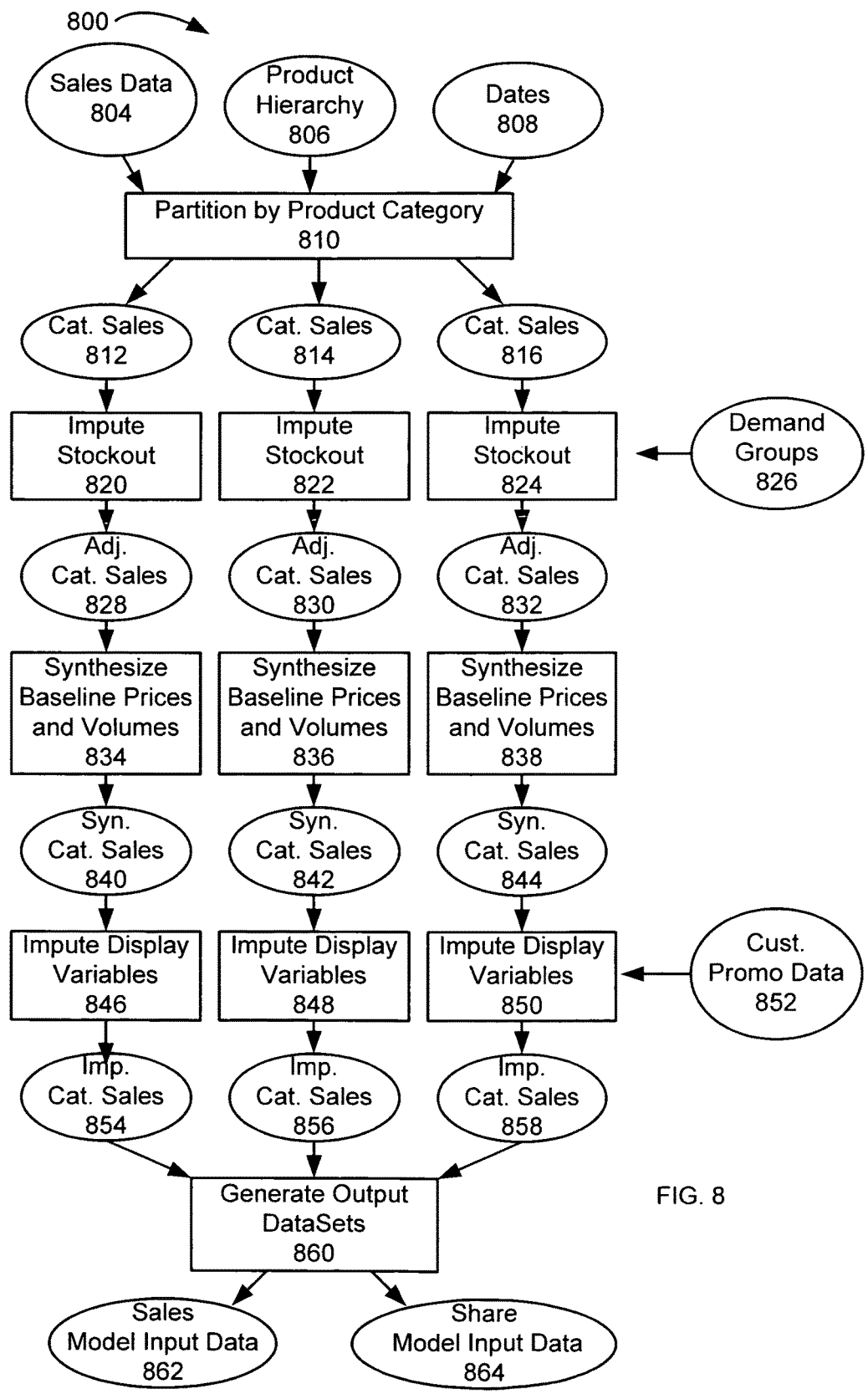
FIG. 8 provides a specific example of an EDTSE flow and flow segments.

FIG. 8 provides a specific example 800 of EDTSE flow and flow segments used for an imputed variable generator. Three different kinds of input data are provided: sales data 804, product hierarchy 806, and dates 808. The sales data 804 provides sales data that may be partitioned by store, product, and week. The product hierarchy data 806 provides information on how products are categorized. The date data 808 provides the specific dates or date ranges for which information is desired. A partition by product category process 810 partitions the input data into subsets, which group the sales data by category and date. In the example shown in FIG. 8, the input data is partitioned into a first category sales subset 812, a second category sales subset 814, and a third category sales subset 816.

A first impute stockout process 820 receives as input the first category sales subset 812 and provides as output a first stock out adjusted category sales subset 828. A second impute stockout process 822 receives as input the second category sales subset 814 and provides as output a second stock out adjusted category sales subset 830. A third impute stockout process 824 receives as input the third category sales subset 816 and provides as output a third stock out adjusted category sales subset 832.

An imputed stockout process reviews entries where no items were sold and determines whether this was caused by the item being out of stock. If it is determined an item is out of stock, an adjustment is made in the data. This may be done by providing a flag to indicate that there was a stock out. The imputed stock out process requires a mathematical operation that analyzes sales of related items for a series of weeks to determine if a stock out occurred and a transformational operation that flags stock out events. Demand group data 826 may also be provided as input to the first, second, and third imputed stockout processes 820, 822, 824, since sales of other items in the same demand group as the item being checked for stockout are used see the demand for other items in the same demand group. If the demand for other items in the demand group was normal, that would help to indicate that lack of sales of the item was due to stock out.

Demand groups are groups of highly substitutable products, such as different sizes or brands of the same product or alternative products.

A first synthesize baseline prices and volumes process 834 receives as input the first stock out adjusted category sales subset 828 and provides as output a first synthesized category sales subset 840. A second synthesize baseline prices and volumes process 836 receives as input the second stock out adjusted category sales subset 830 and provides as output a second synthesized category sales subset 842. A third synthesize baseline prices and volumes process 838 receives as input the third stock out adjusted category sales subset 832 and provides as output a third synthesized category sales subset 844.

The synthesize baseline prices and volume processes impute normalized values for base price and base sales volume by examining the time series of sales for a given product/location and mathematically factoring out promotional, seasonal, and other effects. For example, baseline sales volume represents the amount of a product that would sell in a truly normal week, excluding promotional, seasonal, and all other related factors. This value may never appear in the actual sales data. It is strictly a mathematical construct. Base price similarly represents a normalized baseline sale price for a given item/location combination, excluding promotional and any other factors that affect a product's sale price.

A first imputed display variables process 846 receives as input the first synthesized category sales subset 840 and provides as output a first imputed category sales subset 854. A second imputed display variables process 848 receives as input the second synthesized category sales subset 842 and provides as output a second imputed category sales subset 856. A third imputed display variables process 850 receives as input the third synthesized category sales subset 844 and provides as output a third imputed category sales subset 858. Customer promotional sales data 852 may also be provided as input to the first, second, and third imputed display variable processes 846, 848, 850.

Customer promotional data is data which provides a promotional program for particular items, such as in-store promotional displays. Even though a chain may schedule a promotional display in all stores, some stores may not comply and not carry the promotional display. The impute display variables process measures sales data to determine whether a store actually had a promotional display as indicated by the customer promotional data. If it is determined that a store did not actually have a display, then the customer promotional data may be changed accordingly. In addition, if other types of promotion, such as a flyer, are being used concurrently with a promotional display, an imputed display variables process can determine whether a change in sales is due to the promotional display or other type of promotion.

A generate output datasets process 860 combines the parallel flow outputs of the first, second, and third imputed category sales subsets 854, 856, 858 and provides a first and second sales model input data sets 862, 864. The data is eventually provided to the econometric engine. Additional imputed variable generation steps may be performed before the data is provided to the econometric engine.

In the preferred embodiment, an entire flow for an entire program is put on every computer. The network controls can be used to set which computers on the network perform which part of the entire flow. In another embodiment, different flow segments may be placed on different computers. Output from one flow segment on one computer may then be sent to a subsequent flow segment on another computer.

Figure 9:
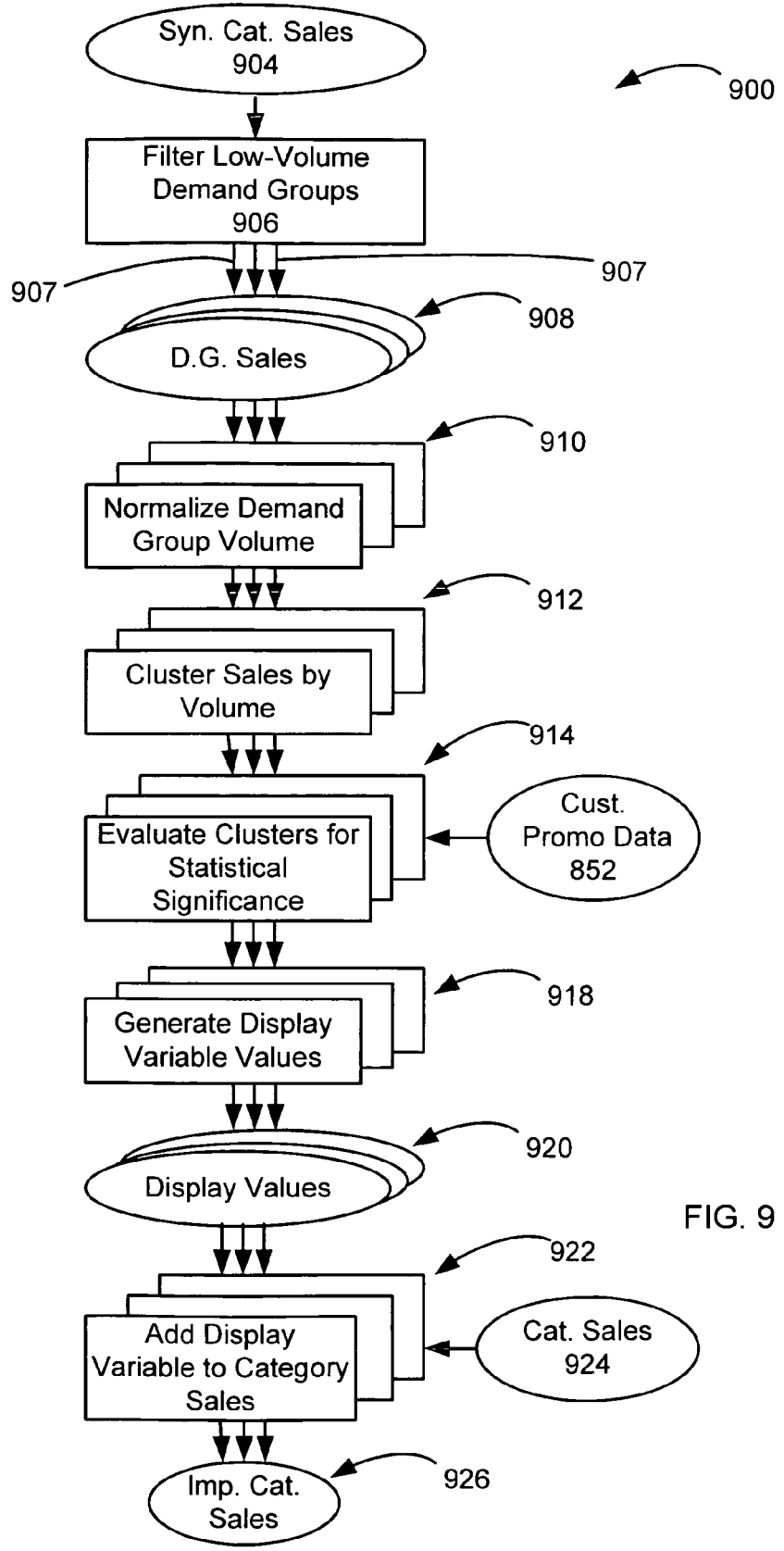
FIG. 9 is a more detailed flow of any of first, second, and third imputed display variable processes.

FIG. 9 is a more detailed flow 900 of any of the first, second, and third imputed display variable processes 846, 848, 850. A synthesized category sales subset 904 is provided as input into a low volume demand group filter 906, which filters low volume demand groups and divides sales according to demand groups to produce a plurality of demand group sales subset data 908. The low volume demand groups are filtered out because if sales volume of the demand group is low, the signal to noise ratio is low, which makes such data unusable because the data may cause more error. In flow 800, the sales data was split by category across different computers. Here data is further split according to demand group across the different threads, allowing additional granularity.

Threads 907 are used so that each thread processes a normalize demand group volume process of a set of normalize demand group volume processes 910. The normalize demand group volume processes normalize the demand group volumes between zero and one. Each thread then processes a cluster by sales volume process of a set of cluster by sales volume processes 912. The cluster by sales volume processes finds clusters of data and group them together.

Each thread then processes an evaluate cluster for statistical significance processes of a set of evaluate clusters for statistical significance processes 914. If sales volume fluctuates from one cluster to another randomly, it may be deemed noise and ignored. If sales volume is in one cluster for several weeks and then in another cluster for several weeks, that may be deemed statistically significant and therefore is not ignored. In addition, the evaluate clusters for statistical significance processes may use customer promotional data 852 to determine if customer promotions are related to the clusters.

Each thread then processes a generate display variable values process of a set of generate display variable values processes 918. The generate display variable values processes generate a set of display variable values 920 to indicate whether or not a cluster is significant. In this example, if the clusters are significant then a value of one is assigned as a display variable and if the clusters are not significant then a value of zero is assigned as a display variable.

Each thread then processes an add display variable to category sales process of a set of add display variable category sales processes 922. The add display variable to category sales processes receive as input the display values and category sales 924 and output imputed category sales 926. The add display variable to category sales processes are pure transformational operation since it takes an existing data set and creates a new value that applies to all of the items in the data set. Data that is generated to determine the imputed display variables by this flow may be discarded.

Although each of the first, second, and third imputed display variable processes 846, 848, 850 are run on a separate computer, a computer running the first imputed display variable process 846 may provide parallel processing by dividing of the first imputed display variable process 846 into multiple threads. While in this example all of the threads are run on a single computer, in an alternative embodiment each thread could be run on a different computer.

Figure 10:
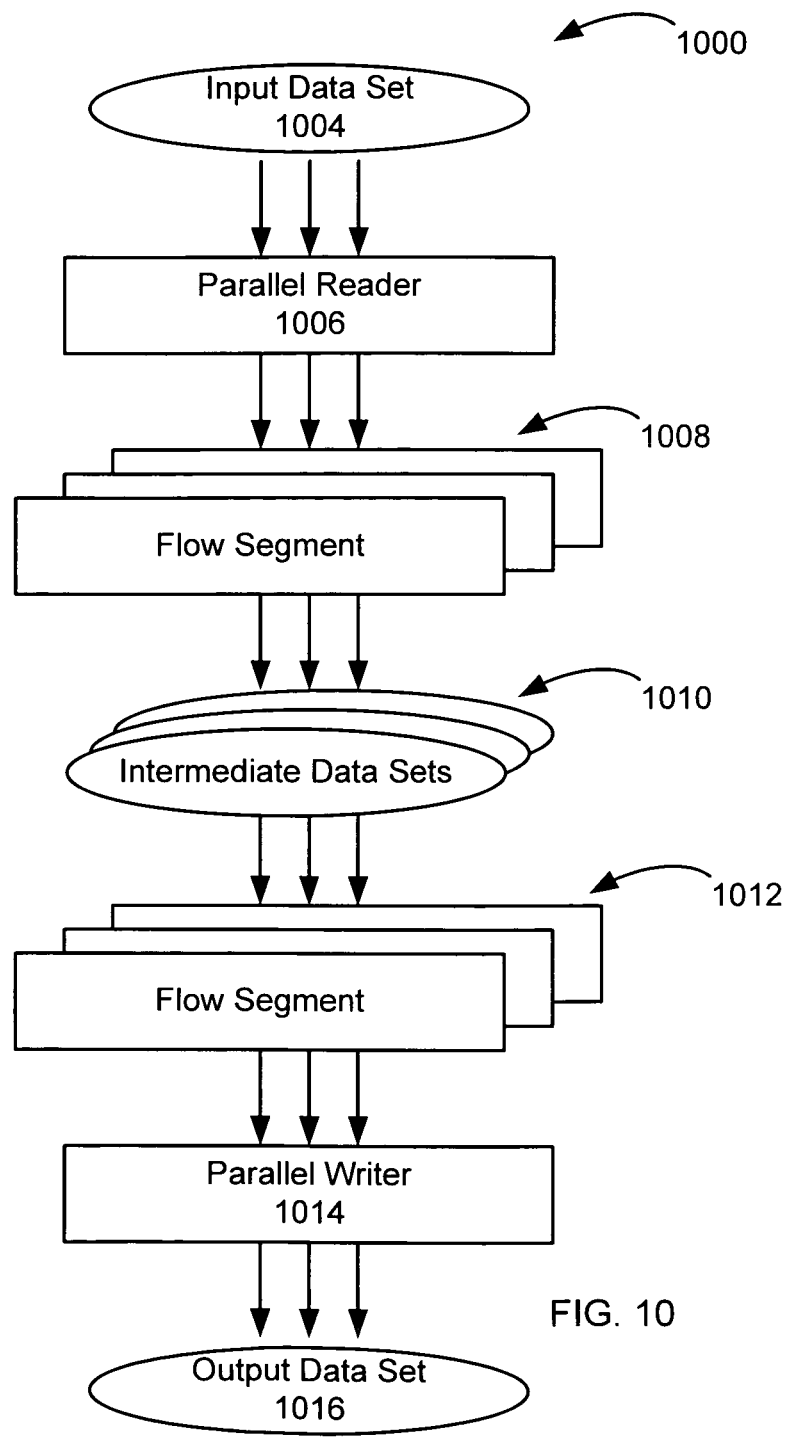
FIG. 10 is a flow that illustrates a process of going from a single input data set to multiple parallel processes.

FIG. 10 is a flow 1000 that illustrates a process of going from a single input data set 1004 to multiple parallel processes, which process the input data set in parallel and then yield a single output data set 1016. The input data set 1004 is read by a parallel reader 1006. The parallel reader 1006 reads from multiple places in the data set 1004 and feeds different data from different locations to different flow segments of a first set of flow segments 1008. For example, for a file with thirty records if there are three parallel flows, ten records may be provided to each of the three parallel flows. In this example, the file is on a disk. The parallel reader 1006 knows the structure of the file of the input data set 1004. From the structure of the file, the parallel reader 1006 is able to take data from various parts of the file, in a nonsequential manner, and send different data to different flow segments of the first set of flow segments 1008 allowing the first set of flow segments to operate in parallel. This may be implemented by putting different data in different buffers. When a flow segment of the set of flow segments 1008 sees that a buffer is filled, the flow segment processes the data in the buffer and outputs the data into a second buffer as intermediate data. The operation of the parallel reader 1006 allows data to be read in parallel, which speeds up the reading of data from a disk, which might otherwise cause a bottleneck. The first set of flow segments creates a set of intermediate data sets 1010, which is provided as input to a second set of flow segments 1012. The second set of flow segments 1012 processes the intermediate data sets 1010 and provides output to a parallel writer 1014, which saves the output of the parallel flows in a file on a disk as an output data set 1016.

The flow 1000 therefore acts as a bucket brigade. To avoid a bottle neck, the parallel reader 1006 may be able to take data from a disk for multiple flow segments 1008 in a single seek operation, because the parallel reader 1006 knows the structure of the data files of the input data set 1004 and may put the data for each different flow segment in a different buffer, which is analogous to taking three buckets and filling them with water at the same time and then making each bucket available to a different recipient, so that the recipients may act in parallel. Acting as state machines, when a buffer for a flow segment of the first set of flow segments 1008 is filled, the flow segment acts on the data in the buffer and then outputs to a second buffer the intermediate data for the intermediate data set 1010. Acting as state machines when second buffers for the flow segments for the second set of flow segments 1012 are filled, the flow segments of the second set of flow segments 1012 operate on the intermediate data in the buffer and provide output to the parallel writer 1014. The parallel writer 1014 is able to combine the data from the second set of flows 1012 into a file on a disk as the output data set 1016. This would be analogous to passing buckets from first recipients, the first set of flow segments 1008, to second recipients, the second set of flow segments 1012, which pass it to a common place, the parallel writer 1014, which is able to dump all three buckets into a single location. As mentioned above, the parallel processing may be where each parallel flow is run on a different computer or a different thread on the same computer.

Figure 14:
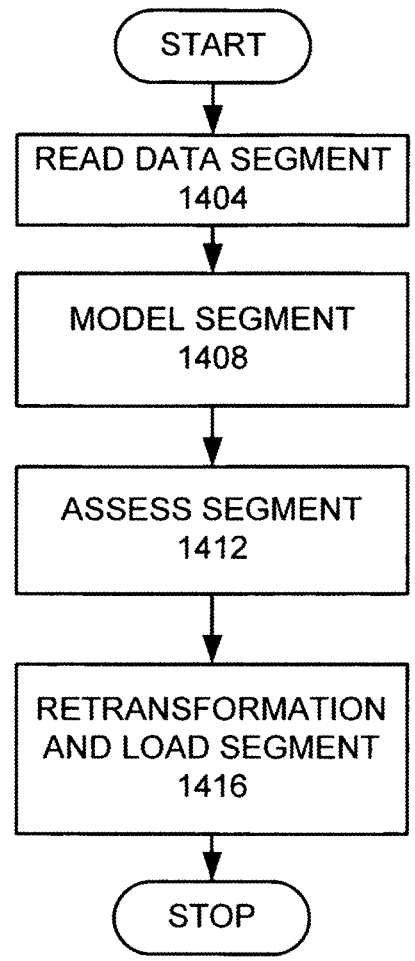
FIG. 14 is a flow chart that illustrates high level econometric modeling operations.

FIG. 14 is a flow chart that illustrates high level econometric modeling operations (executable segments along the process domain), which provides coarse granularity for generating an econometric engine. A first econometric operation is a read data segment 1404. The read data segment 1404 performs data cleansing, such as checking the data to make sure that data is present, formatted in a useable form and providing imputed variables and display variables. A second econometric operation is a model segment 1408. The model segment 1408 performs matrix-solving operations to generate demand coefficients for creating an econometric model. A third econometric operation is an assess segment 1412. The assess segment 1412 checks the demand coefficients and provides metrics that indicate the statistical fit of the model generated by the demand coefficients. A fourth econometric operation is a transformation and load segment 1416. The transformation and load segment 1416 transforms and loads the demand coefficients back into the database for use in the econometric engine.

Each of these high level econometric operations may each be broken into smaller econometric operations. For example, the read data segment 1404 may be broken into its constituent data flow and econometric operations. A simplified description of this process for the read data segment is provided in FIG. 8 and its accompanying text. One step within that process is further decomposed in FIG. 9 and its accompanying text. This process of successive composition illustrates an example of the way an extremely complex process on a large volume of data can be structured and subsequently executed in parallel.

Figure 11:
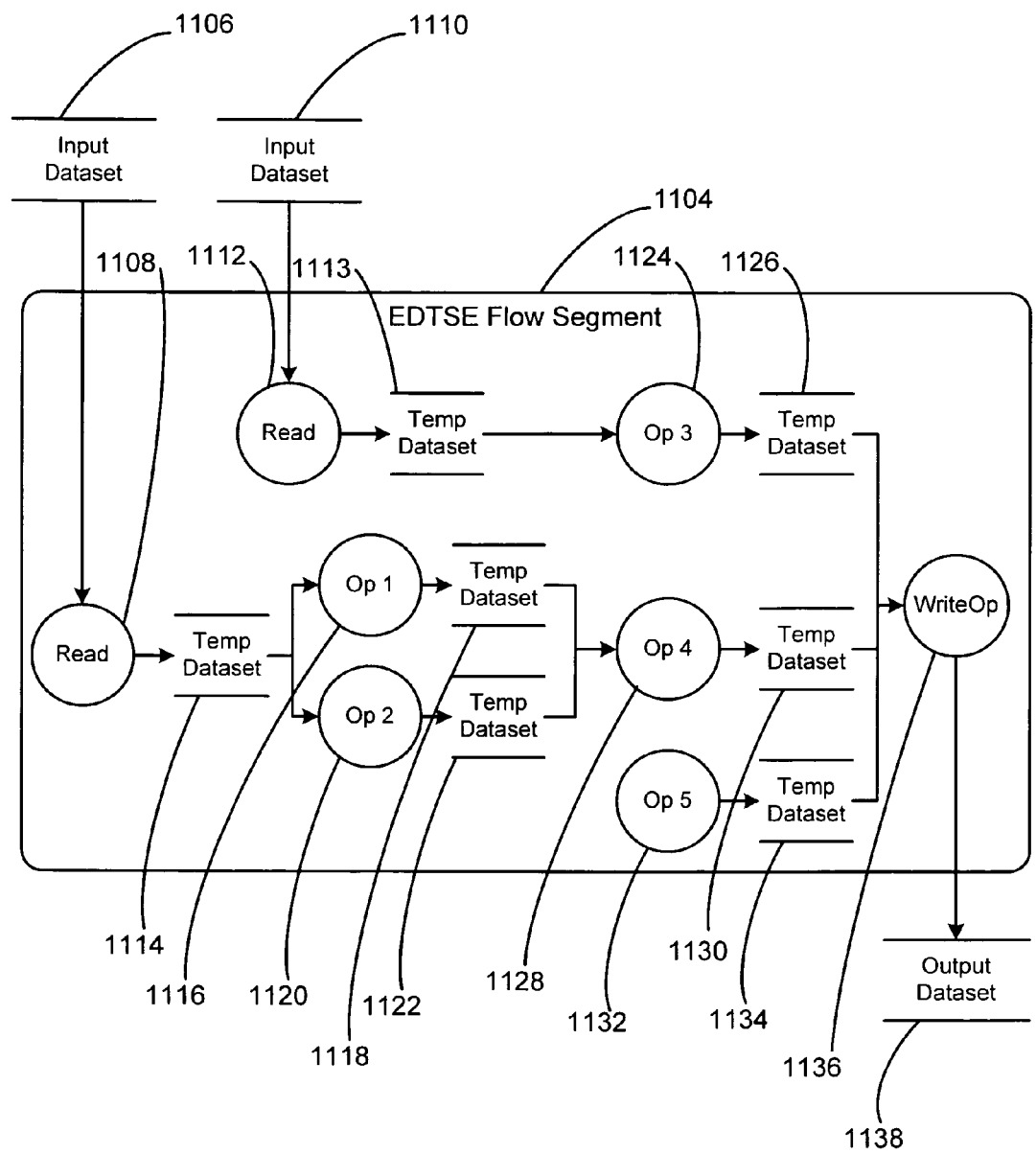
FIG. 11 is a schematic illustration of an internal structure of an EDTSE flow segment at run time.

FIG. 11 is a schematic illustration of an internal structure of an EDTSE flow segment 1104 at run time. A first input dataset 1106 is subjected to a first read operation 1108. A second input dataset 1110 is subjected to a second read operation 1112. Data read by the first read operation 1108 is stored in a first temporary dataset 1114, such as a first buffer. In parallel, data read by the second read operation 1112 is stored in a second temporary dataset 1113, such as a second buffer. A first operation 1116 uses data in the first temporary data set 1114 and outputs data to a third temporary data set 1118. A second operation 1120 uses data in the first temporary dataset 1114 and outputs data to a fourth temporary dataset 1122. In parallel, a third operation 1124 uses data in the second temporary dataset 1113 and outputs data to a fifth temporary dataset 1126. A fourth operation 1128 uses data in the third temporary dataset 1118 and outputs data into a sixth temporary dataset 1130. A fifth operation 1132 outputs to a seventh temporary dataset 1134. A write operation 1136 takes data from the fifth temporary dataset 1126, the sixth temporary data set 1130, and the seventh temporary dataset 1134 and writes it to an output dataset 1138. Generally, a flow segment is a set of processing nodes and arcs between processing nodes that represent what goes into a processing node and what goes out of a processing node.

The operations are examples of various kinds of operations, such as using a single dataset to provide another single dataset, the first, second, and third operations 1116, 1120, 1124. The fourth operation 1128 combines two datasets to obtain a single dataset. The fifth operation 1132 does not have any input data but generates data. An example of such an operation would be a timestamp.

Figure 12:
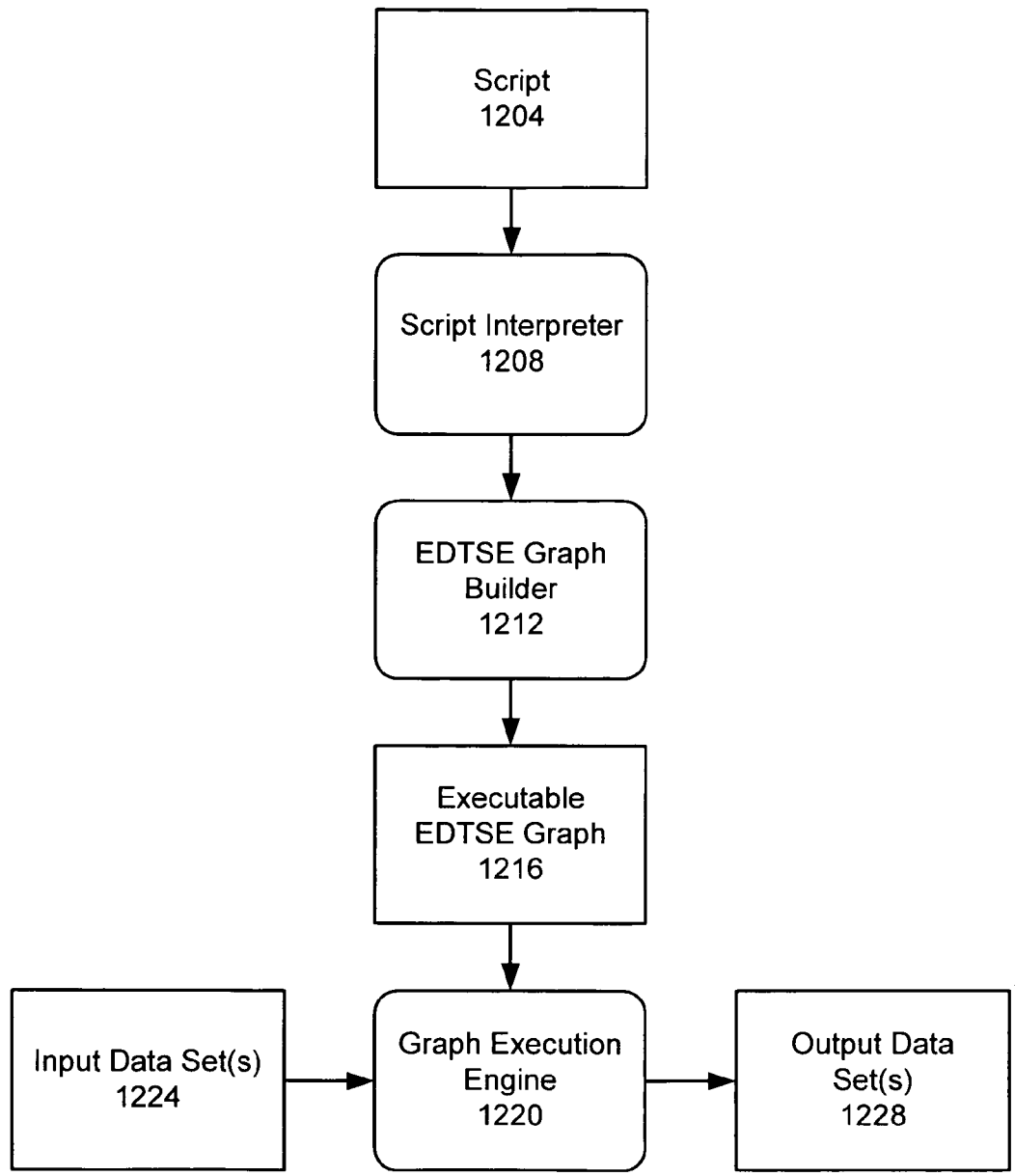
FIG. 12 is a flow of operation during runtime.

FIG. 12 is a flow of operation during runtime. A script 1204 is provided. The script may be in a programming language such as Java™. The script 1204 is interpreted by a script interpreter 1208. An EDTSE graph builder 1212 takes as input the output of the script interpreter 1208 and provides as output an executable EDTSE graph 1216. The EDTSE flow segment 1104 of FIG. 11 is an example of an executable EDTSE graph 1216. The EDTSE graph 1216 is provided as input into a graph execution engine 1220, which is able to actually execute the EDTSE graph 1216. The graph execution engine 1220 can be configured to specify how many parallel buffers would be available, how many threads should be used, and other parameters for determining local parallelism. The graph execution engine 1220 may also be configured to specify parallelism within a network. The graph execution engine 1220 receives input data sets 1224 and provides output data sets 1228.

Below is an example of pseudo code that may be used in an embodiment of the invention:
DataSet inputDS=new DataSet(inlocation);
DataSet outputDS=new DataSet(outlocation);
DataStep d=new DataStep( )
public void declare( )
ColumnSetDescriptor x=read(inputDS);
ColumnSetDescriptor y=expression(x, incolnames, outcolnames,
evalfn( ));
x=subset(x, colnames);
x.appendValues(y);
write(x, outputDS);
;
d.run( );

In the first and second lines, two data sets are declared, an input dataset "inputDS" and an output dataset "outputDS". The third line designates a flow "DataStep". In the fifth line, data set x is read from the input data set. The sixth line is an expression step, which consumes data set x, using as input columns from x and producing output columns, performs an evaluation function on each row of x, thus providing an output data set y. Line 7 takes the input x and subsets it by removing some of the columns of data. Line 8 appends y onto x. Line 9 writes the resulting data set as output. The last line is a command to execute the graph that was built in parallel.

This pseudo code is an example of a range on numerical operations that may be brought together. For example, "evalfn( )" can be any function.

The ability to provide updating using large amounts of data and complex operations, which may be used for demand modeling, may also be used in ad or display performance modeling, brand management, supply chain modeling, financial services such as portfolio management, and even in seemingly-unrelated areas such as capacity optimization for airline or shipping industries, yield optimization for geological or oil/gas industries, network optimization for voice/data or other types of network.

Since the segment flows are created to automatically process data when data is received, the platform provides a more automated process. Such a process is considered an operations process instead of an ad hoc process, which may require a user to receive data and then initiate a program to process the received data to produce output data and then possibly initiate another program to process the output data. The user can configure the system to perform processes automatically as new data arrives, or to set thresholds and other rules so that users can be notified automatically about changes or processes for which they desire human or other approval.

The invention provides a system that is able to quickly process large amounts of sales data to generate resulting distilled and comprehendible information to a user (planner) in real time at the moment the user needs to make a decision and then the system allows the user to make a decision and implement the decision.

In the specification, examples of product are not intended to limit products covered by the claims. Products may for example include food, hardware, software, real estate, financial devices, intellectual property, raw material, and services. The products may be sold wholesale or retail, in a brick and mortar store or over the Internet, or through other sales methods.

While this invention has been described in terms of several preferred embodiments, there are alterations, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A computer implemented method for providing optimized sales planning for a plurality of stores, comprising:
   collecting original sales, cost, and competitive data from the plurality of stores, and wherein the original cost data includes a plurality of original single costs;
   analyzing the collected sales, cost, and competitive data;
   creating, using a processor, a sales plan for a first period of time, which is at least six months, based on the collected data, wherein the sales plan includes product pricing and expected sales;

analyzing on an at least weekly basis during the first period updated sales, cost, and competitive data collected on an at least weekly basis during the first period, wherein the updated cost data includes a plurality of updated single costs corresponding to the plurality of original single costs, and wherein the analyzing further includes:
  interpreting a script with programming language statements and generating from an interpretation of the script an executable graph of a plurality of flows each comprising operations to process the data collected on an at least weekly basis;
  executing the executable graph via a graph execution engine that distributes the plurality of flows among a plurality of different processing elements based on data dependencies between the flows in the executable graph;
  partitioning the data collected on an at least weekly basis into data portions each residing in a different section of a data source;
  reading, in a non-sequential manner during a single reading operation, the data portions from the different sections of the data source to corresponding ones of a plurality of data buffers in parallel to increase a speed of data access, wherein each data buffer corresponds to a flow from among the plurality of flows;
  monitoring an amount of data in each of the data buffers to determine when a data buffer becomes filled for processing by the corresponding flow, wherein at least two of the data buffers become filled and are accessed by the corresponding flows at different times;
  executing the plurality of flows on the plurality of different processing elements in parallel, wherein each flow is responsive to the monitoring and retrieves and processes data from a corresponding data buffer independent of other flows when that corresponding data buffer is filled; and
  receiving the processed data from each of the flows in parallel and producing data for comparison with the sales plan;
generating at least one tuning indicator based on the analyzing data collected on an at least weekly basis during the first period that indicates whether a tuning should be performed, wherein the at least one tuning indicator is generated when a condition is met, and wherein the condition is any of 1) a difference between the product pricing of the sales plan and a competitor price index is greater than a first threshold, 2) a difference between one original single cost and a corresponding updated single cost exceeds a second threshold, and 3) a difference between aggregated original cost data and aggregated updated cost data exceeds a third threshold;
automatically tuning the sales plan, using a processor, if the expected sales of the sales plan is not accurate relative to actual sales within a set percentage, and if a benefit of increased profit from the tuning is greater than cost and time requirements of the tuning; and
providing on demand tuning, using the processor, of the sales plan during the first period, wherein the tuning uses the sales, cost, and competitive data collected during the first period.

2. The computer implemented method, as recited in claim 1, wherein each generated tuning indicator indicates changes in one of values and relationships between original and updated data.

3. A computer implemented method for providing optimized planning, comprising:
  analyzing collected data, wherein the collected data includes original sales, cost, and competitive data, and wherein the original cost data includes a plurality of original single costs;
  creating, using a processor, a plan for a first period of time based on the collected data, wherein the plan includes product pricing and expected sales;
  analyzing a plurality of times during the first period updated sales, cost, and competitive data collected during the first period, wherein the updated cost data includes a plurality of updated single costs corresponding to the plurality of original single costs, and wherein the analyzing further includes:
    interpreting a script with programming language statements and generating from an interpretation of the script an executable graph of a plurality of flows each comprising operations to process the data collected during the first period;
    executing the executable graph via a graph execution engine that distributes the plurality of flows among a plurality of different processing elements based on data dependencies between the flows in the executable graph;
    partitioning the data collected during the first period into data portions each residing in a different section of a data source;
    reading, in a non-sequential manner during a single reading operation, the data portions from the different sections of the data source to corresponding ones of a plurality of data buffers in parallel to increase a speed of data access, wherein each data buffer corresponds to a flow from among the plurality of flows;
    monitoring an amount of data in each of the data buffers to determine when a data buffer becomes filled for processing by the corresponding flow, wherein at least two of the data buffers become filled and are accessed by the corresponding flows at different times;
    executing the plurality of flows on the plurality of different processing elements in parallel, wherein each flow is responsive to the monitoring and retrieves and processes data from a corresponding data buffer independent of other flows when that corresponding data buffer is filled; and
    receiving the processed data from each of the flows in parallel and producing data for comparison with the plan;
  generating at least one tuning indicator based on the analyzing the data collected during the first period that indicates whether a tuning should be performed, wherein the at least one tuning indicator is generated when a condition is met, and wherein the condition is any of 1) a difference between the product pricing of the plan and a competitor price index is greater than a first threshold, 2) a difference between one original single cost and a corresponding updated single cost exceeds a second threshold, and 3) a difference between aggregated original cost data and aggregated updated cost data exceeds a third threshold; and
  determining if tuning is required by comparing expected sales of the plan to actual sales, and the comparing is not accurate within a set percentage;
  tuning, using a processor, the plan a plurality of times during the first period when the expected sales of the plan is not accurate relative to the actual sales within the set percentage, wherein the tuning uses the data collected during the first period, and wherein a tuning frequency is determined by balancing a benefit of increased profit from the tuning with cost and time requirements of the tuning, such that the benefit of the tuning is greater than the cost and time requirements of the tuning.

4. The computer implemented method, as recited in claim 3, wherein the analyzing a plurality of times comprises analyzing at least six times, and wherein the tuning the plan a plurality of times comprises tuning the plan at least three times.

5. The computer implemented method, as recited in claim 4, wherein the tuning is on demand.

6. The computer implemented method, as recited in claim 5, wherein the tuning of the plan occurs automatically when at least one tuning indicator is generated.

7. The computer implemented method, as recited in claim 6, wherein each generated tuning indicator indicates changes in one of values and relationships between original and updated data.

8. The computer implemented method, as recited in claim 5, wherein each generated tuning indicator indicates changes in one of values and relationships between original and updated data.

9. The computer implemented method, as recited in claim 4, wherein the optimized planning is optimized sales planning for a plurality of stores.

10. The computer implemented method, as recited in claim 4, wherein the tuning of the plan occurs automatically when at least one tuning indicator is generated when costs change.

11. The computer implemented method, as recited in claim 10, wherein each generated tuning indicator indicates changes in one of values and relationships between original and updated data.

12. The computer implemented method, as recited in claim 4, wherein the generation of at least one tuning indicator is based on a percentage change between original and updated data.

13. The computer implemented method, as recited in claim 4, wherein the analyzing collected data comprises generating demand coefficients for an optimization model.

14. The computer implemented method, as recited in claim 13, further comprising providing a support tool for providing at least one tuning indicator to a user and for providing optimization rules from the user to the optimization model.

15. The computer implemented method, as recited in claim 14, wherein the support tool further provides a selection for implementing a tuned optimization.

16. The computer implemented method, as recited in claim 15, wherein the support tool further provides a selection of different sets of optimization rules to create a plurality of different scenarios.

17. The computer implemented method, as recited in claim 16, wherein the support tool provides a selection for implementing a tuned plan.

18. The computer implemented method, as recited in claim 3, further comprising providing a support tool for providing at least one tuning indicator to a user and for providing optimization rules from the user to an optimization model.

19. The computer implemented method, as recited in claim 3, wherein the first period of time is at least six months, and wherein the analyzing a plurality of times during the first period comprises analyzing on at least a weekly basis.

20. A system for providing optimized sales planning for a plurality of stores, comprising:
    a data transformation engine configured to collect original sales, cost, and competitive data from the plurality of stores, and wherein the original cost data includes a plurality of original single costs;
    an econometric engine configured to analyze the collected sales, cost, and competitive data;
    an optimization engine configured to create a sales plan for a first period of time, which is at least six months, based on the collected data, wherein the sales plan includes product pricing and expected sales;
    the econometric engine further configured to:
        analyze on an at least weekly basis during the first period updated sales, cost, and competitive data collected on an at least weekly basis during the first period, wherein the updated cost data includes a plurality of updated single costs corresponding to the plurality of original single costs, and wherein the analyzing further includes:
            interpreting a script with programming language statements and generating from an interpretation of the script an executable graph of a plurality of flows each comprising operations to process the data collected on an at least weekly basis;
            executing the executable graph via a graph execution engine that distributes the plurality of flows among a plurality of different processing elements based on data dependencies between the flows in the executable graph;
            partitioning the data collected on an at least weekly basis into data portions each residing in a different section of a data source;
            reading, in a non-sequential manner during a single reading operation, the data portions from the different sections of the data source to corresponding ones of a plurality of data buffers in parallel to increase a speed of data access, wherein each data buffer corresponds to a flow from among the plurality of flows;
            monitoring an amount of data in each of the data buffers to determine when a data buffer becomes filled for processing by the corresponding flow, wherein at least two of the data buffers become filled and are accessed by the corresponding flows at different times;
            executing the plurality of flows on the plurality of different processing elements in parallel, wherein each flow is responsive to the monitoring and retrieves and processes data from a corresponding data buffer independent of other flows when that corresponding data buffer is filled; and
            receiving the processed data from each of the flows in parallel and producing data for comparison with the sales plan; and
        generate at least one tuning indicator based on the analyzing data collected on an at least weekly basis during the first period that indicates whether a tuning should be performed, wherein the at least one tuning indicator is generated when a condition is met, and wherein the condition is any of 1) a difference between the product pricing of the sales plan and a competitor price index is greater than a first threshold, 2) a difference between one original single cost and a corresponding updated single cost exceeds a second threshold, and 3) a difference between aggregated original cost data and aggregated updated cost data exceeds a third threshold; and the optimization engine further configured to provide on demand tuning of the sales plan during the first period when the expected sales of the sales plan is not accurate relative to actual sales within a set percentage, wherein the tuning uses the sales, cost, and competitive data collected during the first period, and wherein a tuning frequency is determined by balancing a benefit of increased profit from the tuning with cost and time requirements of the tuning, such that the benefit of the tuning is greater than the cost and time requirements of the tuning.

* * * * *